(12) United States Patent
Bayer et al.

(10) Patent No.: US 12,164,020 B2
(45) Date of Patent: Dec. 10, 2024

(54) MULTI-TONE CONTINUOUS WAVE DETECTION AND RANGING

(71) Applicant: THE REGENTS OF THE UNIVERSITY OF CALIFORNIA, Oakland, CA (US)

(72) Inventors: Mustafa Mert Bayer, Irvine, CA (US); Ozdal Boyraz, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 521 days.

(21) Appl. No.: 17/467,012

(22) Filed: Sep. 3, 2021

(65) Prior Publication Data

US 2023/0131584 A1    Apr. 27, 2023

Related U.S. Application Data

(63) Continuation-in-part of application No. 17/409,076, filed on Aug. 23, 2021, now abandoned, which is a
(Continued)

(51) Int. Cl.
G01S 13/58 (2006.01)

(52) U.S. Cl.
CPC ................. G01S 13/584 (2013.01)

(58) Field of Classification Search
CPC ........ G01S 13/584; G01S 17/36; G01S 17/58; G01S 13/347; G01S 13/36; G01S 13/582; G01S 2013/9323; G01S 7/4911
See application file for complete search history.

(56) References Cited

U.S. PATENT DOCUMENTS

| 6,128,276 A | * | 10/2000 | Agee | .................. H04L 5/026 |
| | | | | 370/335 |
| 6,697,148 B1 | * | 2/2004 | Hopwood | ............... G01S 17/10 |
| | | | | 356/28.5 |

(Continued)

FOREIGN PATENT DOCUMENTS

WO    2010025846 A1    3/2010

OTHER PUBLICATIONS https://www.elektronikfokus.dk/wp-content/uploads/sites/5/AppNote71-MULTI-TONE-TESTING.pdf (Year: 2015).*
(Continued)

*Primary Examiner* — Mohamed K Amara
(74) *Attorney, Agent, or Firm* — NGUYEN TARBET IP LAW

(57) ABSTRACT

Various examples for multi-tone continuous wave detection and ranging are disclosed herein. In some embodiments, an initial signal is generated using initial radio frequency (RF) tones, and is emitted as a multi-tone continuous wave signal. The initial signal is reflected from a target and received as a reflected signal. Resultant RF tones, including a frequency, a phase and a power, are determined from the reflected signal in a frequency domain. A frequency-domain sinusoidal wave is fitted to the resultant RF tones in the frequency domain, and a distance to the target is determined using a modulation of the frequency-domain sinusoidal wave. A phase processing algorithm is applied to generate the target distance and speed by triangulating the range information encoded in the backscattered RF tones.

20 Claims, 35 Drawing Sheets

Related U.S. Application Data continuation-in-part of application No. 16/666,582, filed on Oct. 29, 2019, now Pat. No. 11,630,189.

(60) Provisional application No. 63/068,766, filed on Aug. 21, 2020, provisional application No. 62/757,951, filed on Nov. 9, 2018.

(56) References Cited

U.S. PATENT DOCUMENTS

| | | | | |
|---|---|---|---|---|
| 7,085,499 | B2* | 8/2006 | Yap | H04B 10/2575 |
| | | | | 398/186 |
| 7,164,117 | B2* | 1/2007 | Breed | B60N 2/002 |
| | | | | 250/221 |
| 7,463,364 | B2* | 12/2008 | Yacoubian | G01N 29/2418 |
| | | | | 356/502 |
| 7,593,449 | B2* | 9/2009 | Shattil | H04J 13/10 |
| | | | | 375/150 |
| 7,787,514 | B2* | 8/2010 | Shattil | H04L 27/2631 |
| | | | | 375/130 |
| 8,750,717 | B1* | 6/2014 | Yap | G02F 2/02 |
| | | | | 398/163 |
| 9,482,740 | B2* | 11/2016 | Keegan | G01S 5/0278 |
| 9,606,234 | B2* | 3/2017 | Major, Jr. | G01S 7/499 |
| 9,722,842 | B2* | 8/2017 | Agee | H04W 72/23 |
| 9,805,273 | B1* | 10/2017 | Seeber | G08G 5/0069 |
| 9,814,047 | B2* | 11/2017 | Kong | H04W 52/0203 |
| 10,243,652 | B2* | 3/2019 | Heath | H04L 41/069 |
| 10,270,547 | B2* | 4/2019 | Pratt | H04L 27/34 |
| 11,075,786 | B1* | 7/2021 | Shattil | H04L 5/0007 |
| 2003/0123584 | A1 | 7/2003 | Siegel et al. | |
| 2004/0021875 | A1 | 2/2004 | Northby | |
| 2007/0046945 | A1 | 3/2007 | Schwiesow | |
| 2010/0118407 | A1* | 5/2010 | Huff | G02B 5/1861 |
| | | | | 359/359 |
| 2012/0065494 | A1* | 3/2012 | Gertner | A61B 8/06 |
| | | | | 601/2 |
| 2012/0082251 | A1* | 4/2012 | Vanden Bossche | G01R 23/163 |
| | | | | 375/259 |
| 2013/0009804 | A1* | 1/2013 | Valentine | G01S 13/66 |
| | | | | 342/146 |
| 2013/0230131 | A1* | 9/2013 | Moore | H04B 1/30 |
| | | | | 455/296 |
| 2014/0016115 | A1 | 1/2014 | Shimon et al. | |
| 2016/0305755 | A1* | 10/2016 | Edwards | F42C 13/04 |
| 2019/0312689 | A1 | 10/2019 | Opshaug et al. | |
| 2020/0132847 | A1 | 4/2020 | Hillard et al. | |
| 2020/0142068 | A1 | 5/2020 | Crouch et al. | |
| 2020/0195833 | A1* | 6/2020 | Sivan | G06F 3/013 |
| 2020/0367810 | A1* | 11/2020 | Shouldice | H04R 1/08 |
| 2020/0371212 | A1 | 11/2020 | Rumala | |
| 2021/0370064 | A1 | 12/2021 | Murphy et al. | |
| 2021/0382164 | A1 | 12/2021 | Bayer et al. | |
| 2022/0229155 | A1* | 7/2022 | Schrattenecker | G01S 7/40 |
| 2024/0000333 | A1* | 1/2024 | Pratt | A61B 5/6891 |
| 2024/0023816 | A1* | 1/2024 | Shouldice | A61B 5/05 |

OTHER PUBLICATIONS

Torun, Rasul. Optical Methods for Ranging and Analog-to-Digital Conversion. University of California, Irvine, 2019.

Torun et al. "Multi-tone modulated continuous-wave lidar." Photonic Instrumentation Engineering VI. vol. 10925. SPIE, 2019.

Boyraz et al. "Multi Tone Continuous Wave Lidar." 2019 IEEE Photonics Society Summer Topical Meeting Series (SUM). IEEE, 2019.

Torun et al. "Realization of multitone continuous wave LiDAR." IEEE Photonics Journal 11.4 (2019): 1-10.

Bayer et al. "Simultaneous ranging and velocimetry with multi-tone continuous wave lidar." Optics Express 28.12 (2020): 17241-17252.

* cited by examiner

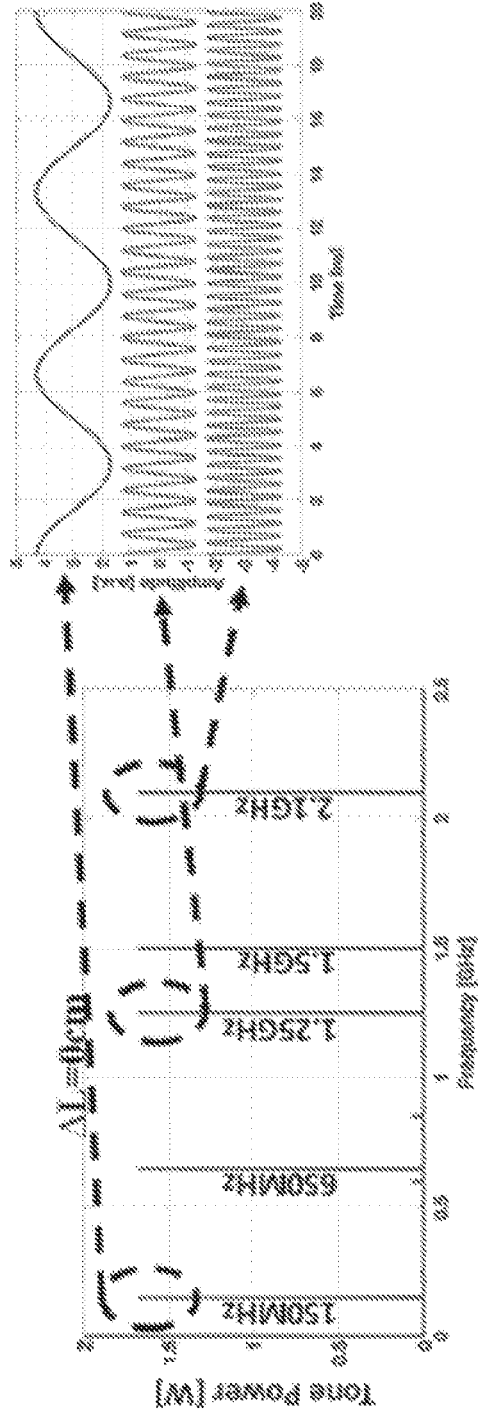
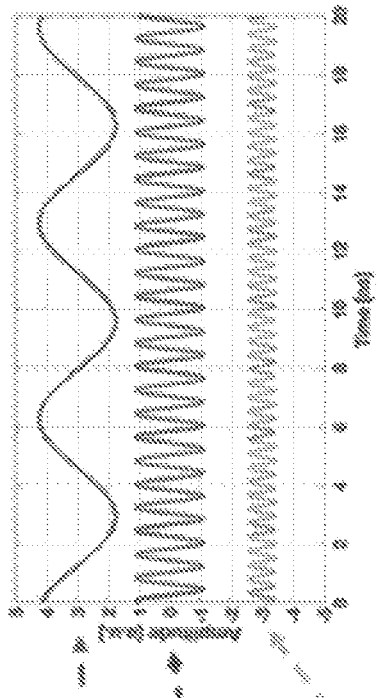
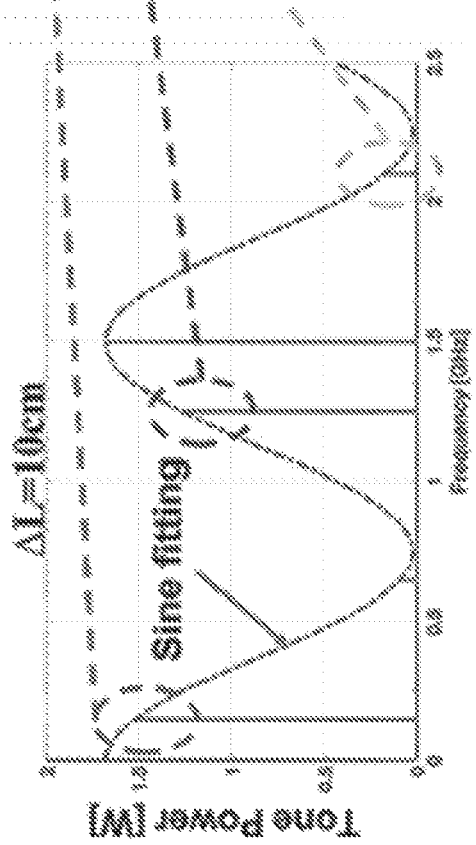
FIG. 5A
FIG. 5B

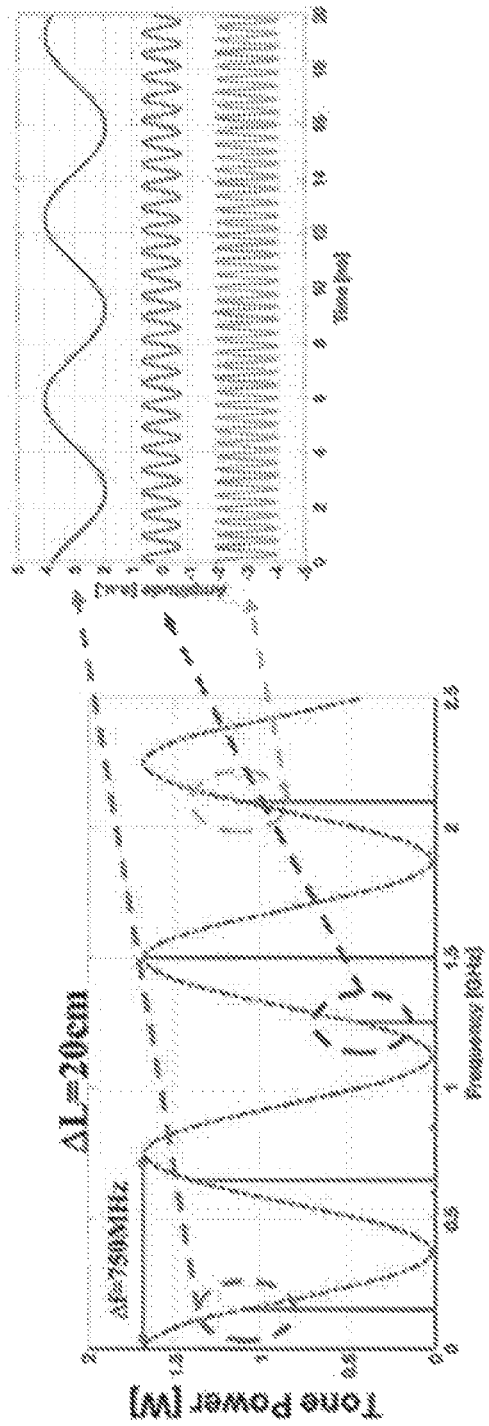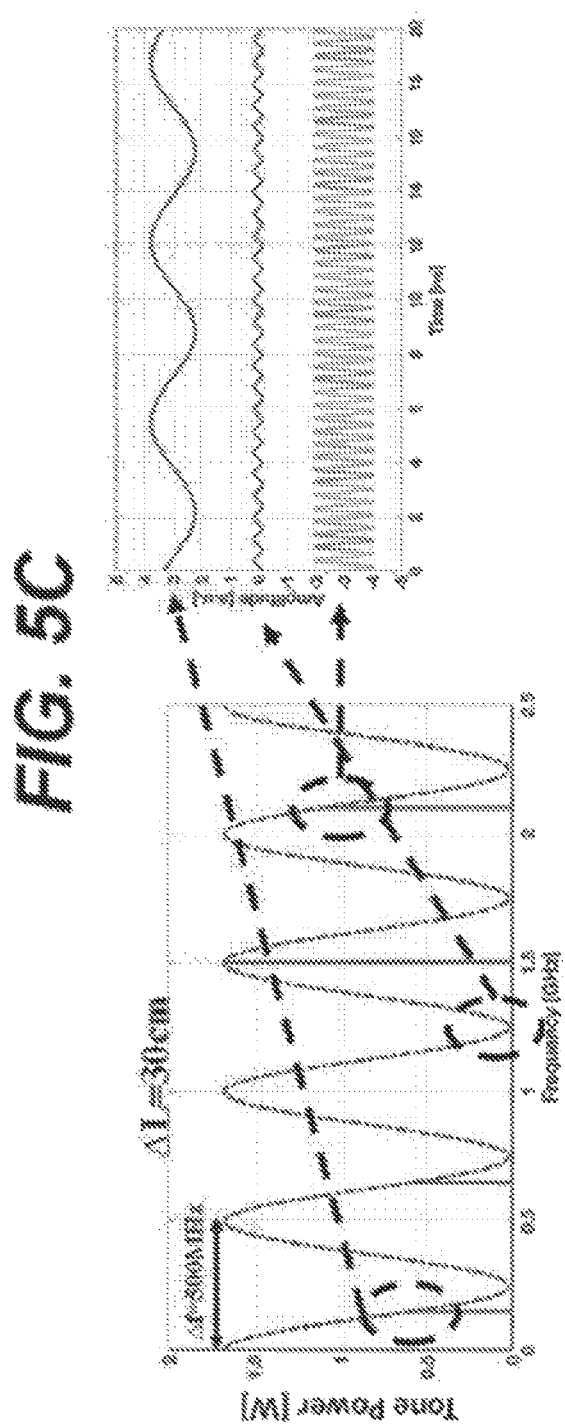
FIG. 5C
FIG. 5D $$\begin{array}{c}
\phantom{XX} l \\
\phantom{X}\begin{array}{ccc} \omega_3-\omega_2 & \omega_3-\omega_1 & \omega_2-\omega_1 \end{array} \\
k \begin{array}{c} 1 \\ 2 \\ 3 \\ 4 \\ \vdots \\ 300 \\ 301 \\ 302 \\ \vdots \\ 498 \\ 499 \\ 500 \end{array} \left[ \begin{array}{ccc} k=1 & k=1 & k=1 \\ k=2 & \text{repeat} & \text{repeat} \\ k=3 & \text{repeat} & \text{repeat} \\ k=4 & \text{repeat} & \text{repeat} \\ \vdots & \text{repeat} & k=2\text{-}10 \\ k=300 & k=2 & k=11 \\ k=301 & \text{repeat} & \text{repeat} \\ k=302 & \text{repeat} & \text{repeat} \\ \vdots & k=3 & k=12\text{-}17 \\ k=498 & \text{repeat} & k=18 \\ k=499 & \text{repeat} & \text{repeat} \\ k=500 & \text{repeat} & \text{repeat} \end{array} \right]
\end{array}$$

FIG. 10D

$$I_{PD} = RA_{ref}^2 + RA_m^2 + RA_{ref}A_m \left[ \exp\left(j\omega_I t + j\omega_I \frac{L_{ref}}{c}\right) + \exp\left(-j\omega_I t - j\omega_I \frac{L_m}{c}\right) \right]$$

$$- mRA_{ref}^2 \sum_{i=1}^{N} \left[ \exp\left(j\omega_I t + j\omega_i \frac{2L_{ref}}{c}\right) + \exp\left(-j\omega_I t - j\omega_i \frac{2L_{ref}}{c}\right) \right] - mRA_m^2 \sum_{i=1}^{N} \left[ \exp\left(j\omega_I t + j\omega_i \frac{2L_m}{c}\right) + \exp\left(-j\omega_I t - j\omega_i \frac{2L_m}{c}\right) \right]$$

$$+ \frac{m^2 RA_{ref}^2}{4} \sum_{i=1}^{N} \left[ 2 + \exp\left(j2\omega_I t + j\omega_i \frac{4L_{ref}}{c}\right) + \exp\left(-j2\omega_I t - j\omega_i \frac{4L_{ref}}{c}\right) \right]$$

$$+ \frac{m^2 RA_m^2}{4} \sum_{i=1}^{N} \left[ 2 + \exp\left(j2\omega_I t + j\omega_i \frac{4L_m}{c}\right) + \exp\left(-j2\omega_I t - j\omega_i \frac{4L_m}{c}\right) \right]$$

$$- \frac{mRA_m A_{ref}}{2} \sum_{i=1}^{N} \begin{bmatrix} \exp\left(j(\omega_I + \omega_d)t + j\left(\omega_i \frac{2L_{ref}}{c} + \omega_d \frac{L_m}{c}\right)\right) + \exp\left(-j(\omega_I + \omega_d)t - j\left(\omega_i \frac{2L_{ref}}{c} + \omega_d \frac{L_m}{c}\right)\right) \\ + \exp\left(j(\omega_I + \omega_d)t + j\left(\omega_i \frac{2L_m}{c} + \omega_d \frac{L_m}{c}\right)\right) + \exp\left(-j(\omega_I + \omega_d)t - j\left(\omega_i \frac{2L_m}{c} + \omega_d \frac{L_m}{c}\right)\right) \\ + \exp\left(j(\omega_I - \omega_d)t + j\left(\omega_i \frac{2L_{ref}}{c} - \omega_d \frac{L_m}{c}\right)\right) + \exp\left(-j(\omega_I - \omega_d)t - j\left(\omega_i \frac{2L_{ref}}{c} - \omega_d \frac{L_m}{c}\right)\right) \\ + \exp\left(j(\omega_I - \omega_d)t + j\left(\omega_i \frac{2L_m}{c} - \omega_d \frac{L_m}{c}\right)\right) + \exp\left(-j(\omega_I - \omega_d)t - j\left(\omega_i \frac{2L_m}{c} - \omega_d \frac{L_m}{c}\right)\right) \end{bmatrix}$$

$$+ \frac{m^2 RA_m A_{ref}}{4} \sum_{i=1}^{N} \begin{bmatrix} \exp\left(j(2\omega_I + \omega_d)t + j\left(2\omega_i \left(\frac{L_{ref}+L_m}{c}\right) + \omega_d \frac{L_m}{c}\right)\right) + \exp\left(-j(2\omega_I + \omega_d)t - j\left(2\omega_i \left(\frac{L_{ref}+L_m}{c}\right) + \omega_d \frac{L_m}{c}\right)\right) \\ + \exp\left(j(2\omega_I - \omega_d)t + j\left(2\omega_i \left(\frac{L_{ref}+L_m}{c}\right) - \omega_d \frac{L_m}{c}\right)\right) + \exp\left(-j(2\omega_I - \omega_d)t - j\left(2\omega_i \left(\frac{L_{ref}+L_m}{c}\right) - \omega_d \frac{L_m}{c}\right)\right) \\ + \exp\left(j\omega_d t + j\left(2\omega_i \left(\frac{L_{ref}-L_m}{c}\right) + \omega_d \frac{L_m}{c}\right)\right) + \exp\left(-j\omega_d t - j\left(2\omega_i \left(\frac{L_{ref}-L_m}{c}\right) + \omega_d \frac{L_m}{c}\right)\right) \\ + \exp\left(j\omega_d t + j\left(2\omega_i \left(\frac{L_{ref}-L_m}{c}\right) - \omega_d \frac{L_m}{c}\right)\right) + \exp\left(-j\omega_d t - j\left(2\omega_i \left(\frac{L_{ref}-L_m}{c}\right) - \omega_d \frac{L_m}{c}\right)\right) \end{bmatrix}$$

FIG. 18

| Frequency | Amplitude | Phase | $L_0^{\omega_i \pm \omega_d}$ |
|---|---|---|---|
| $\omega_i + \omega_d$ | $-4mRA_m A_{ref} \cos\left(\frac{\omega_i}{c}(L_m - L_{ref})\right)$ | $\frac{\omega_i+\omega_d}{c}L_m + \frac{\omega_i}{c}L_{ref}$ | $L_0^{\omega_i+\omega_d} = \frac{c\phi_{\omega_i+\omega_d}^{meas} - \omega_i L_{ref}}{\omega_i+\omega_d}$ |
| $\omega_i - \omega_d$ | $-4mRA_m A_{ref} \cos\left(\frac{\omega_i}{c}(L_m - L_{ref})\right)$ | $\frac{\omega_i-\omega_d}{c}L_m + \frac{\omega_i}{c}L_{ref}$ | $L_0^{\omega_i-\omega_d} = \frac{c\phi_{\omega_i-\omega_d}^{meas} - \omega_i L_{ref}}{\omega_i-\omega_d}$ |
| $2\omega_i + \omega_d$ | $\frac{m^2 R A_m A_{ref}}{2}$ | $\left(2\omega_i\left(\frac{L_m+L_{ref}}{c}\right) + \omega_d \frac{L_m}{c}\right)$ | $L_0^{2\omega_i+\omega_d} = \frac{c\phi_{2\omega_i+\omega_d}^{meas} - 2\omega_i L_{ref}}{2\omega_i+\omega_d}$ |
| $2\omega_i - \omega_d$ | $\frac{m^2 R A_m A_{ref}}{2}$ | $\left(2\omega_i\left(\frac{L_m+L_{ref}}{c}\right) - \omega_d \frac{L_m}{c}\right)$ | $L_0^{2\omega_i-\omega_d} = \frac{c\phi_{2\omega_i-\omega_d}^{meas} - 2\omega_i L_{ref}}{2\omega_i-\omega_d}$ |

FIG. 19

$$\begin{aligned}
I_{PD} =\ & RA_{ref}^2 + RA_m^2 + RA_{ref}A_m \left[ \exp\left(j\omega_d t + j\omega_d \frac{L_m}{c}\right) + \exp\left(-j\omega_d t - j\omega_d \frac{L_m}{c}\right) \right] \\
& - mRA_{ref}^2 \sum_{i=1}^{N} \left[ \exp\left(j\omega_i t + j\omega_i \frac{2L_{ref}}{c}\right) + \exp\left(-j\omega_i t - j\omega_i \frac{2L_{ref}}{c}\right) \right] - mRA_m^2 \sum_{i=1}^{N} \left[ \exp\left(j\omega_i t + j\omega_i \frac{2L_m}{c}\right) + \exp\left(-j\omega_i t - j\omega_i \frac{2L_m}{c}\right) \right] \\
& + \frac{m^2 RA_{ref}^2}{4} \sum_{i=1}^{N} \left[ 2 + \exp\left(j2\omega_i t + j\omega_i \frac{4L_{ref}}{c}\right) + \exp\left(-j2\omega_i t - j\omega_i \frac{4L_{ref}}{c}\right) \right] \\
& + \frac{m^2 RA_m^2}{4} \sum_{i=1}^{N} \left[ 2 + \exp\left(j2\omega_i t + j\omega_i \frac{4L_m}{c}\right) + \exp\left(-j2\omega_i t - j\omega_i \frac{4L_m}{c}\right) \right] \\
& + \frac{mRA_m A_{ref}}{2} \sum_{i=1}^{N} \left[ \begin{aligned} & \exp\left(j(\omega_i + \omega_d)t + j\left(\omega_i \frac{2L_{ref}}{c} + \omega_d \frac{L_m}{c}\right)\right) + \exp\left(-j(\omega_i + \omega_d)t - j\left(\omega_i \frac{2L_{ref}}{c} + \omega_d \frac{L_m}{c}\right)\right) \\ & + \exp\left(j(\omega_i - \omega_d)t + j\left(\omega_i \frac{2L_m}{c} + \omega_d \frac{L_m}{c}\right)\right) + \exp\left(-j(\omega_i + \omega_d)t - j\left(\omega_i \frac{2L_m}{c} + \omega_d \frac{L_m}{c}\right)\right) \\ & + \exp\left(j(\omega_i - \omega_d)t + j\left(\omega_i \frac{2L_{ref}}{c} - \omega_d \frac{L_m}{c}\right)\right) + \exp\left(-j(\omega_i - \omega_d)t - j\left(\omega_i \frac{2L_{ref}}{c} - \omega_d \frac{L_m}{c}\right)\right) \\ & + \exp\left(j(\omega_i - \omega_d)t + j\left(\omega_i \frac{2L_m}{c} - \omega_d \frac{L_m}{c}\right)\right) + \exp\left(-j(\omega_i - \omega_d)t - j\left(\omega_i \frac{2L_m}{c} - \omega_d \frac{L_m}{c}\right)\right) \end{aligned} \right] \\
& + \frac{m^2 RA_m A_{ref}}{4} \sum_{i=1}^{N} \left[ \begin{aligned} & \exp\left(j(2\omega_i + \omega_d)t + j\left(2\omega_i \frac{L_m + L_{ref}}{c} + \omega_d \frac{L_m}{c}\right)\right) + \exp\left(-j(2\omega_i + \omega_d)t - j\left(2\omega_i \frac{L_m + L_{ref}}{c} + \omega_d \frac{L_m}{c}\right)\right) \\ & + \exp\left(j(2\omega_i - \omega_d)t + j\left(2\omega_i \frac{L_m + L_{ref}}{c} - \omega_d \frac{L_m}{c}\right)\right) + \exp\left(-j(2\omega_i - \omega_d)t - j\left(2\omega_i \frac{L_m + L_{ref}}{c} - \omega_d \frac{L_m}{c}\right)\right) \\ & + \exp\left(j\omega_d t + j\left(2\omega_i \frac{L_m - L_{ref}}{c} + \omega_d \frac{L_m}{c}\right)\right) + \exp\left(-j\omega_d t - j\left(2\omega_i \frac{L_m - L_{ref}}{c} + \omega_d \frac{L_m}{c}\right)\right) \\ & + \exp\left(j\omega_d t + j\left(2\omega_i \frac{L_m - L_{ref}}{c} - \omega_d \frac{L_m}{c}\right)\right) + \exp\left(-j\omega_d t - j\left(2\omega_i \frac{L_m - L_{ref}}{c} - \omega_d \frac{L_m}{c}\right)\right) \end{aligned} \right]
\end{aligned} \quad (\text{Eq. 1})$$

FIG. 28

MULTI-TONE CONTINUOUS WAVE DETECTION AND RANGING

CROSS-REFERENCES TO RELATED APPLICATIONS

This application is a continuation-in-part and claims benefit of U.S. patent application Ser. No. 17/409,076, filed Aug. 23, 2021, which is also a continuation-in-part and claims benefit of U.S. Non-Provisional patent application Ser. No. 16/666,582, filed Oct. 29, 2019, which claims benefit of U.S. Provisional Patent Application No. 62/757,951, filed Nov. 9, 2018, the specification(s) of which is/are incorporated herein in their entirety by reference.

U.S. patent application Ser. No. 17/409,076 is also a non-provisional and claims benefit of U.S. Provisional Patent Application No. 63/068,766, filed Aug. 21, 2020, the specification(s) of which is/are incorporated herein in their entirety by reference.

STATEMENT REGARDING FEDERALLY SPONSORED RESEARCH OR DEVELOPMENT

This invention was made with government support under Grant No. N00014-18-1-2845, awarded by the Navy/ONR and Grant No. NNX16AT64A, awarded by NASA. The government has certain rights in the invention.

FIELD OF THE INVENTION

The present invention is directed to systems and methods for multi-tone continuous wave detection and ranging.

BACKGROUND OF THE INVENTION

Radio detection and ranging (RADAR) applications, as well as light detection and ranging (LIDAR), can be used for remote sensing to measure the distance of objects up to thousands of feet away. LIDAR and RADAR can find applications in technologies ranging from self-driving vehicles to atmospheric and topographic mapping. These technologies emit electromagnetic signals to determine how long they take to come back after scattering from the surfaces they encounter or to determine changes in properties of the emitted electromagnetic signal. These surfaces can be solid, liquid, or gas/aerosol. A sensor finally uses information on travel time or changes in signal properties to determine distance to the object.

Pre-existing types of LIDAR measurement may comprise time of flight, amplitude-modulated coherent LIDAR, frequency-modulated coherent LIDAR, and phase-based coherent LIDAR. Time of flight is the most common method and may comprise measuring the time delay between incident and backscattered laser pulses. This method may have high peak power, may not be suitable for coherent detection, may require fast electronics, and may involve no direct velocity measurement. Amplitude-modulated coherent LIDAR may be a light intensity modulation and may comprise measuring the phase difference between a reference and backscattered signal, convolving a local oscillator with the time-delayed backscattered signal, and sweeping the amplitude and phase of the reference to find the range. This method may be used for short ranges. Frequency-modulated coherent LIDAR may involve light frequency modulation by frequency sweeping and may comprise measuring the range by observing the beatings after optical heterodyning and executing simultaneous ranging and velocimetry. This method may be limited by modulation BW, slow sweep rate, sweep or chirp linearity, as well as the coherence length of the utilized CW laser. Phase-based coherent LIDAR may involve multiple wavelengths transmitted with the same phase. Multiple detectors may be used to extract phase information of each wavelength and may require phase extraction algorithms.

Additional methods may comprise pulsed time-of-flight LIDAR. Disadvantages of this method are that it is not possible to acquire velocity with single shot measurements or achieve simultaneous ranging and velocimetry without post processing, limited ranging resolution, and distance ambiguity. Other additional methods may comprise continuous wave LIDAR. Disadvantages of this method are that it requires high quality narrow linewidth lasers for maximum distance ranging, is unable to achieve single shot measurements, requires sweeping, and requires multiple channels.

Though the conventional LIDAR and RADAR methods are effective, they can be time consuming due to the need for consecutive measurements, or sweeping, or they require radiation sources with stringent phase and frequency requirements. This, for example, limits the application of LIDAR in systems such as satellite monitoring, where the motion of the object prohibits its successive measurement due to sweeping duration. Also, standard LIDAR using time information as a means to measure distance is not capable of detecting velocity information from objects it encounters.

BRIEF SUMMARY OF THE INVENTION

It is an objective of the present invention to provide systems and methods for multi-tone continuous wave detection and ranging, as specified in the independent claims. Embodiments of the invention are given in the dependent claims. Embodiments of the present invention can be freely combined with each other if they are not mutually exclusive.

The present disclosure relates to systems and methods that utilize multi-tone continuous wave signals for applications from range and velocity detection to atmospheric and topographic mapping. Multi-tone continuous wave (MTCW) detection and ranging is capable of simultaneous range and velocity measurements and is less susceptible to interference effects than standard techniques. Also, this method eliminates the range limitations imposed by the quality of lasers in standard coherent LIDAR techniques. This technology eliminates the time consuming frequency or phase scan of standard coherent LIDARS and makes single shot and fast LIDAR measurements possible. The technology is scalable to any frequency of electromagnetic radiation and hence it is applicable to radio frequency detection and ranging RADAR or TeraHertz applications. Simultaneous modulation via several radio-frequency (RF) tones makes the system faster, more robust and longer range compared to conventional frequency modulated continuous-wave (FMCW) LIDARs or comparable RADAR technologies, as the need for successive measurements and need for a frequency sweep can be eliminated. The system uses a continuous wave (CW) or a quasi continuous wave, rather than pulsed, radiation source or laser, and so requires less complicated optical components. Usage of several RF tones can make the system more robust, allowing for single-shot simultaneous measurement of object distance and velocity. In addition, utilization of the individual phases and frequencies of the sidebands paves the way for new algorithms that allows noise cancellation and ranging beyond the coherence limit of a CW laser, and hence eliminates the need for low phase-noise, narrow linewidth lasers. The system can also be highly sensitive, capable of cm-scale resolution at longer distances, and have high dynamic range due to coherent detection. Moreover, the same technology can be used as an independent positioning or navigation tool.

One of the unique and inventive technical features of the present invention is the generation of a multi-tone continuous wave optical signal from a sum of multiple RF modulation tones in LIDAR detection and ranging. Without wishing to limit the invention to any theory or mechanism, it is believed that the technical feature of the present invention advantageously provides for the obviation of the need for consecutive measurements with swept sources to measure the distance and velocity of an object being detected or ranged. None of the presently known prior references or work has the unique inventive technical feature of the present invention.

Any feature or combination of features described herein are included within the scope of the present invention, provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIGS. 4-7 are graphs that illustrate principles used for multi-tone continuous wave detection and ranging, according to various embodiments.

Figure 10A:
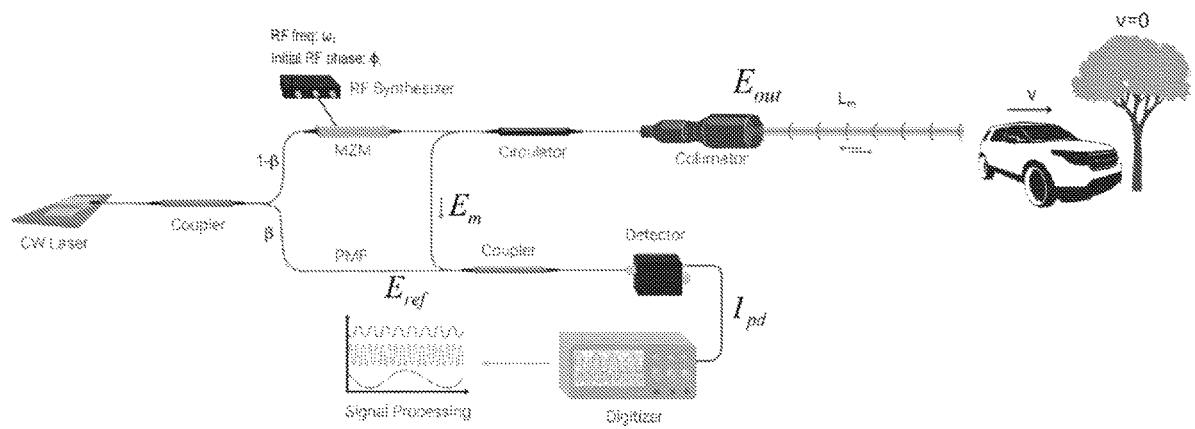
FIG. 10A shows a system for phase-based multi-tone continuous wave (PB-MTCW) light detection and ranging (LIDAR) that can perform ranging at distances beyond the coherence length of a radiation source.
Figure 10B:
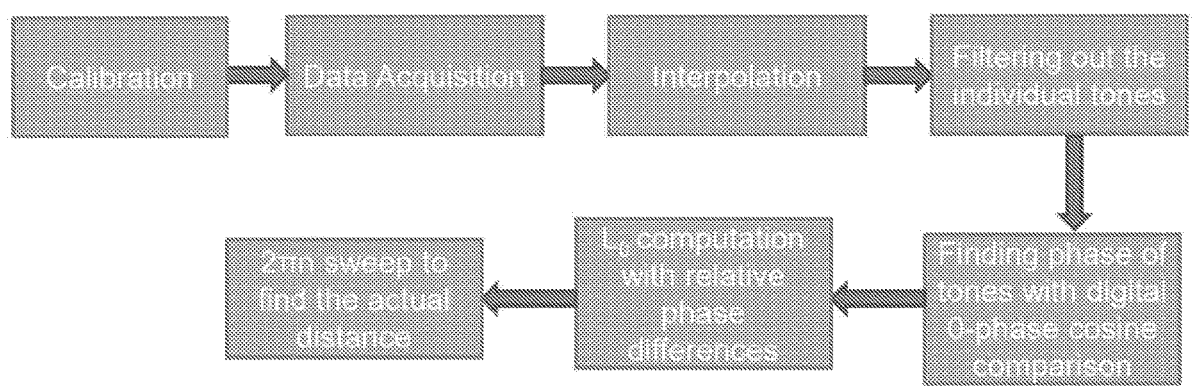
FIG. 10B shows an example of a flow chart of a method for PB-MTCW LIDAR detection and ranging of a static target.
Figure 10C:
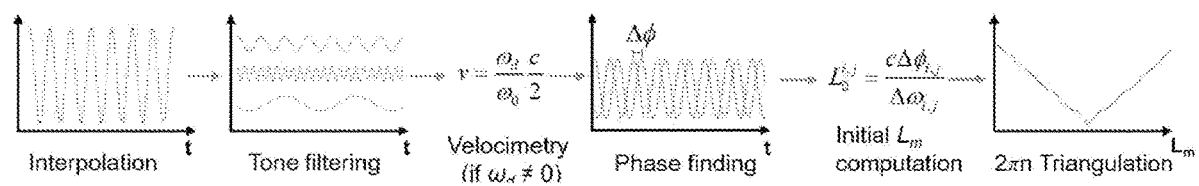
Figure 10E:
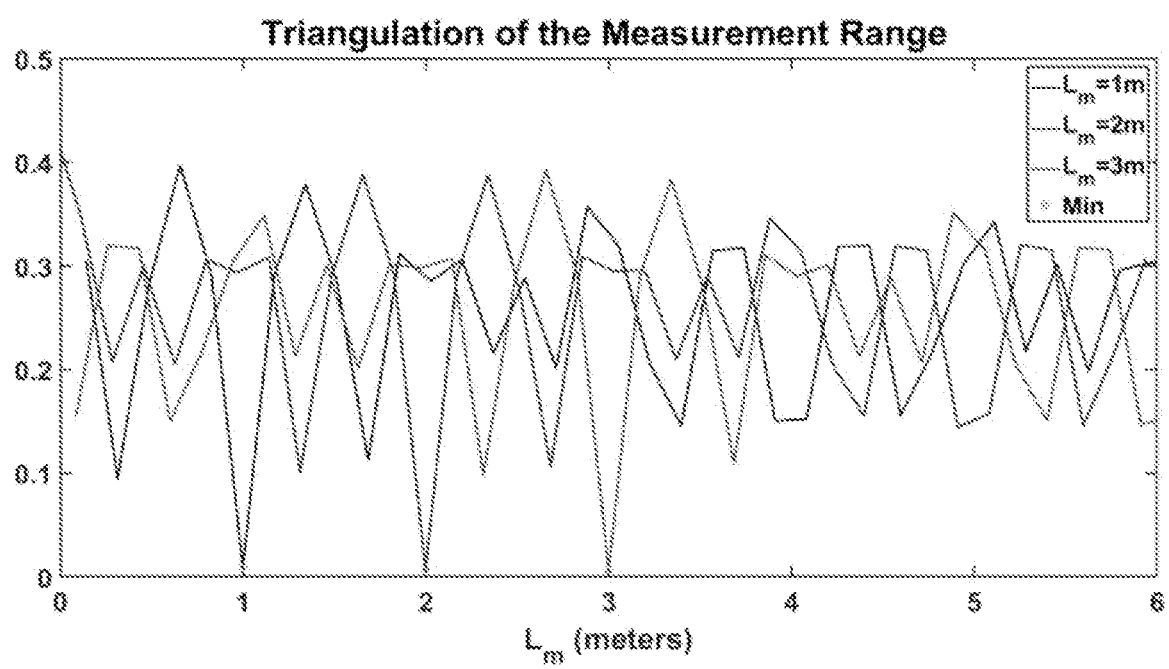
Figure 10F:
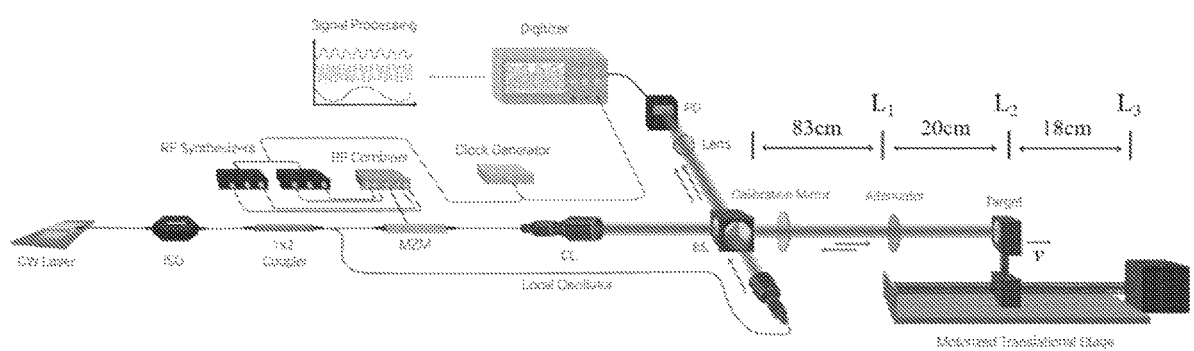

FIG. 10C shows a flow chart of a post-processing algorithm to measure the range in a PB-MTCW LIDAR system. FIG. 10D shows an example of a matrix of phase difference combination values. FIG. 10E shows an example graph produced by a triangulation algorithm of the present invention. FIG. 10F shows an alternate embodiment of the system for PB-MTCW LIDAR.

Figure 11:
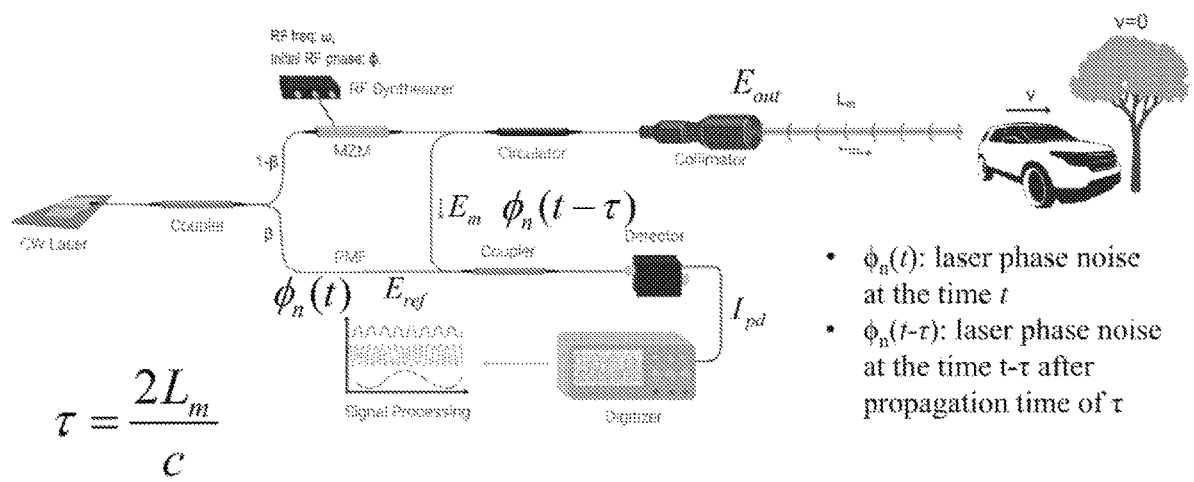

FIG. 11 shows a system for PB-MTCW LIDAR detection and ranging with a low coherence source.

Figure 12A:
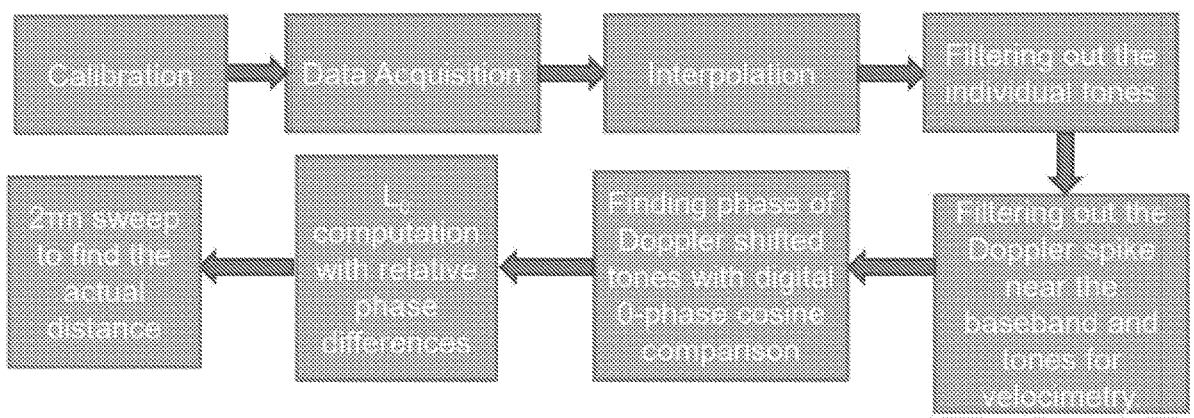
Figure 12B:
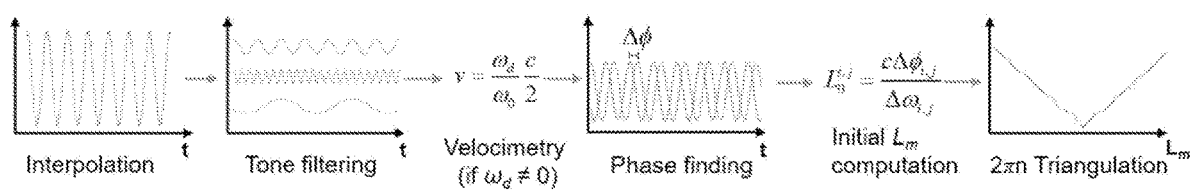
Figure 12C:
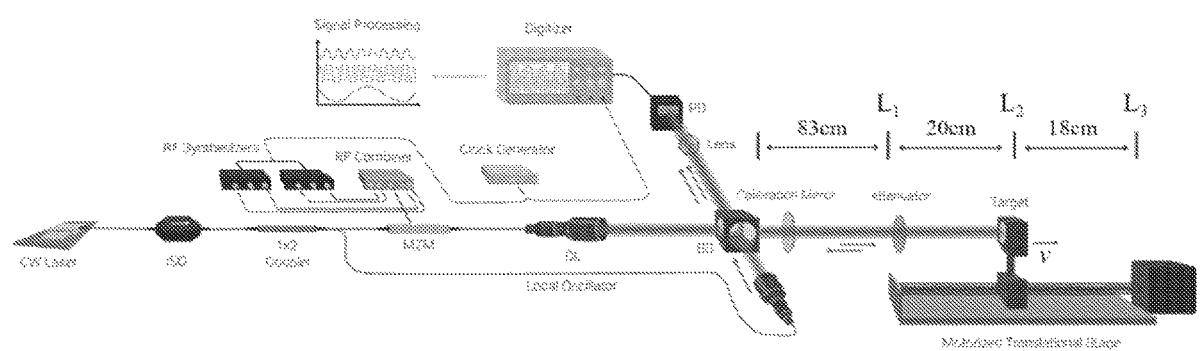

FIG. 12A shows an example of a flow chart of a method for PB-MTCW LIDAR detection and ranging of a dynamic target. FIG. 12B shows a flow chart of a post-processing routine of the PB-MTCW LIDAR system of the presently claimed invention. FIG. 12C shows a diagram of an exemplary embodiment of the PB-MTCW LIDAR system of the presently claimed invention.

Figure 13:
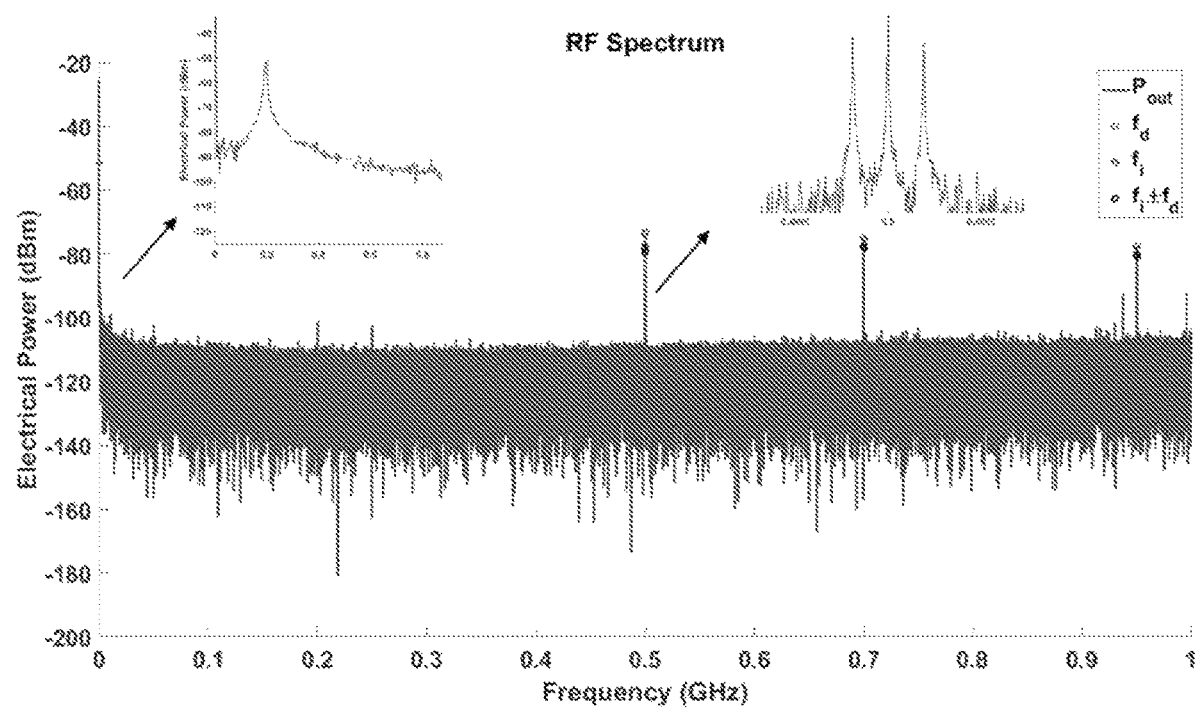

FIG. 13 shows an RF spectrum graph of a PB-MTCW LIDAR system with a highly coherent source and a dynamic target.

Figure 14:
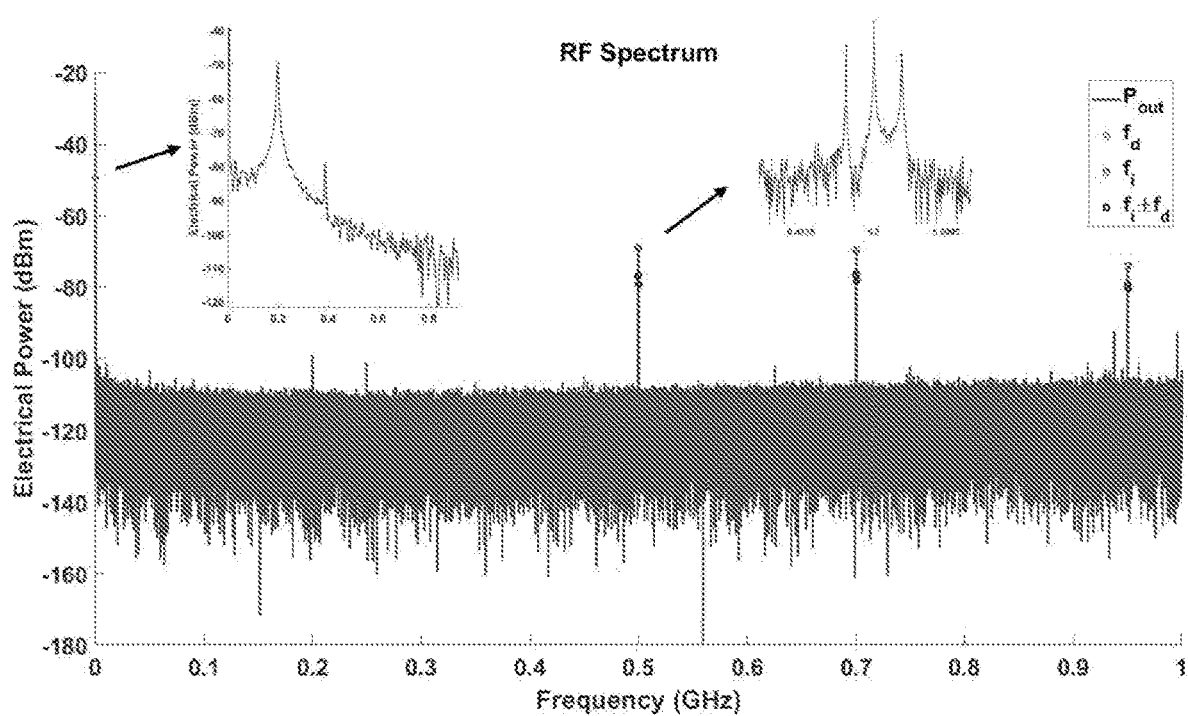

FIG. 14 shows an RF spectrum graph of a PB-MTCW LIDAR system with a low coherence source and a dynamic target.

Figure 15A:
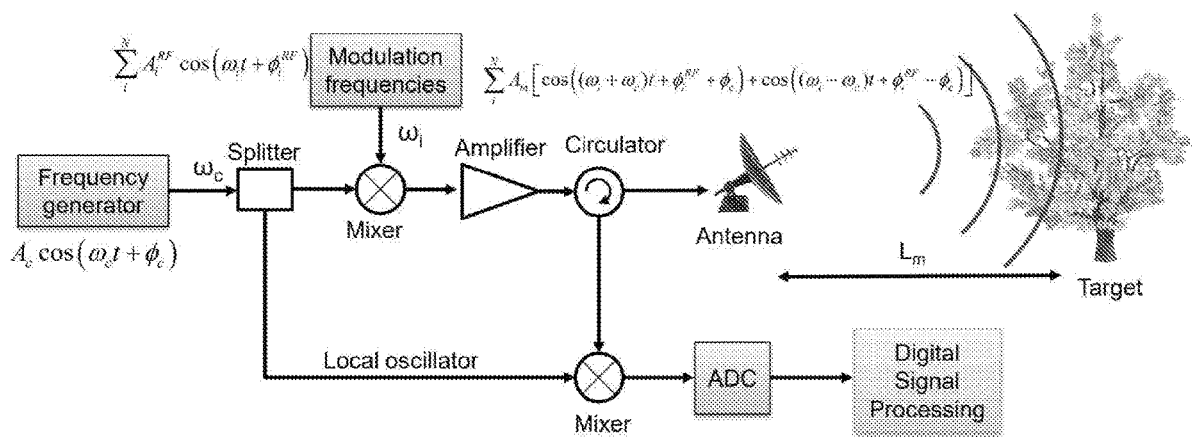
Figure 15B:
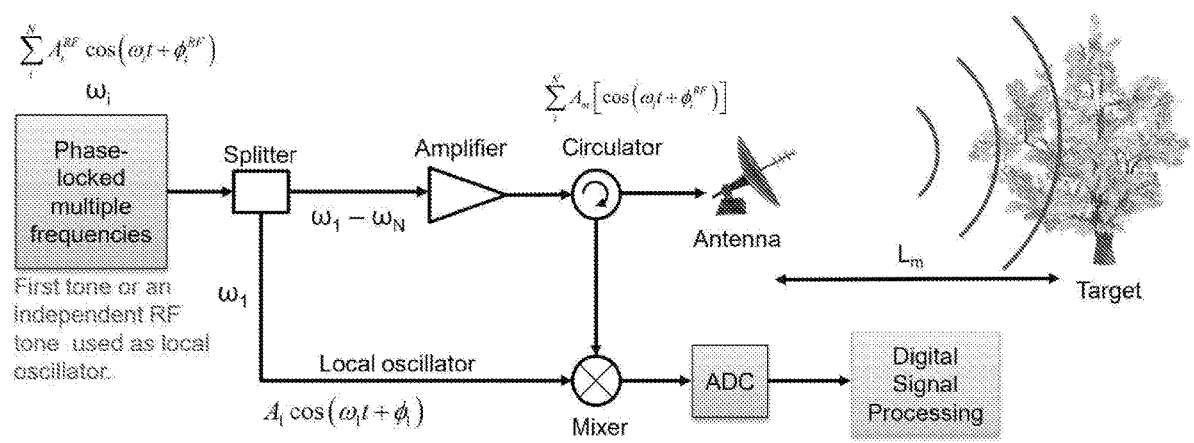

FIG. 15A shows a first embodiment of an implementation of the PB-MTCW ranging methodology for a RADAR system with RF carrier. FIG. 15B shows a second embodiment of an implementation of the PB-MTCW system for RADAR without RF carrier with RF tones.

Figure 16:
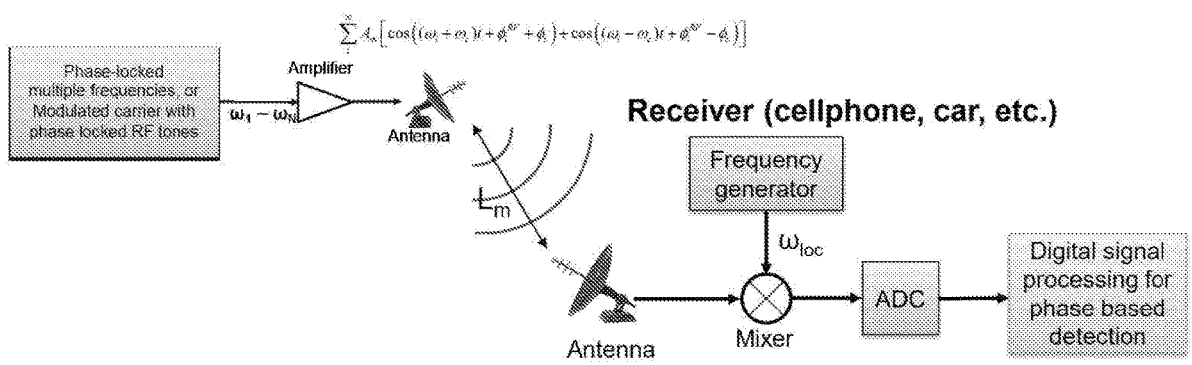

FIG. 16 shows an implementation of the RF based PB-MTCW system of the present invention for GPS without a reference clock.

Figure 17:
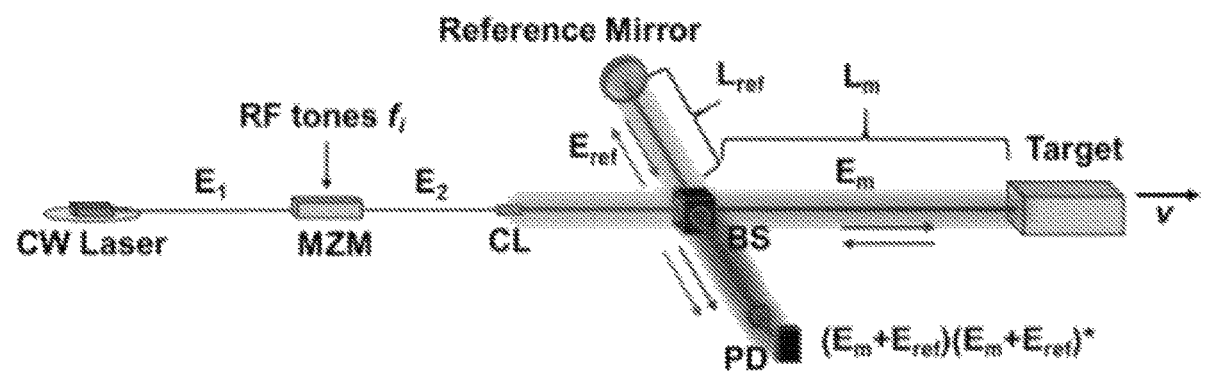

FIG. 17 shows a schematic of the MTCW lidar that consists of a narrow linewidth CW laser, Mach-Zehnder modulator (MZM), collimator (CL), beamsplitter (BS), reference mirror, and photodetector (PD). The target and reference distances are labeled as $L_m$ and $L_{ref}$ respectively.

FIG. 18 shows an equation showing the final photocurrent ($I_{pd}$) generated by the MTCW system with a dynamic target.

FIG. 19 shows a table of resultant frequencies and their corresponding amplitude, phase, and initial length ($L_0$) equations.

Figure 20:
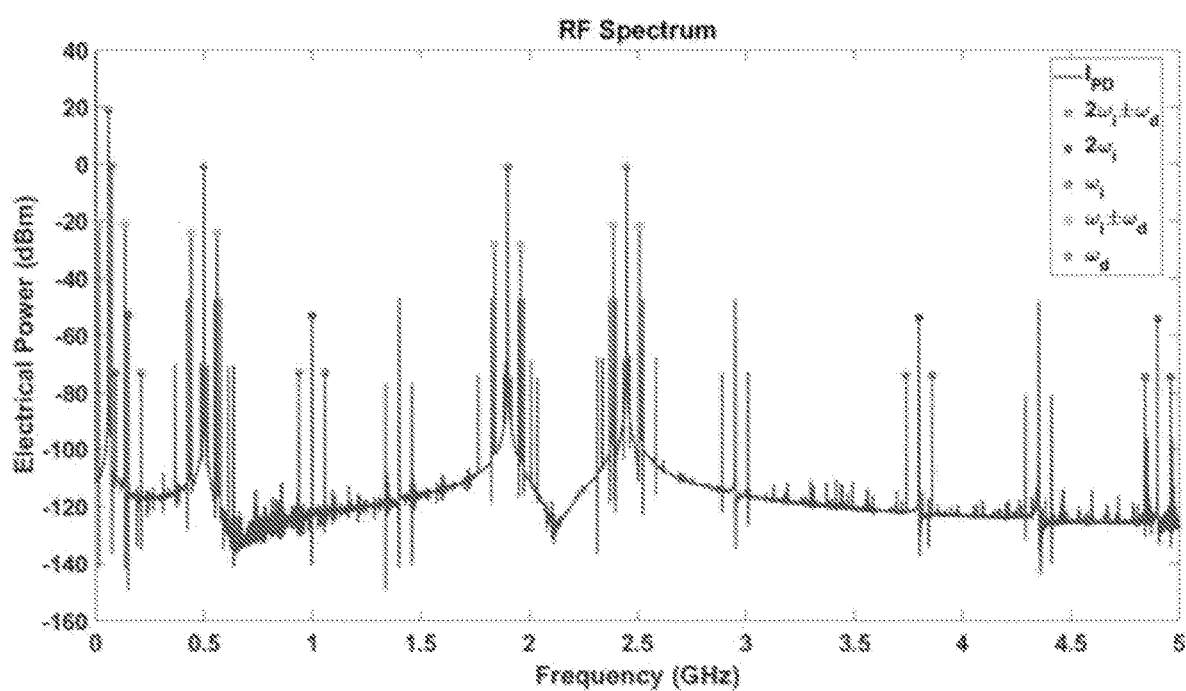

FIG. 20 shows an RF spectrum of the resultant $I_{PD}$ of a target at 50 m with 108 km/h speed. Each modulation tone, higher-order frequencies, their corresponding Doppler shifts, and the Doppler frequency ($\omega_d$) are indicated on the RF spectrum.

Figure 21A:
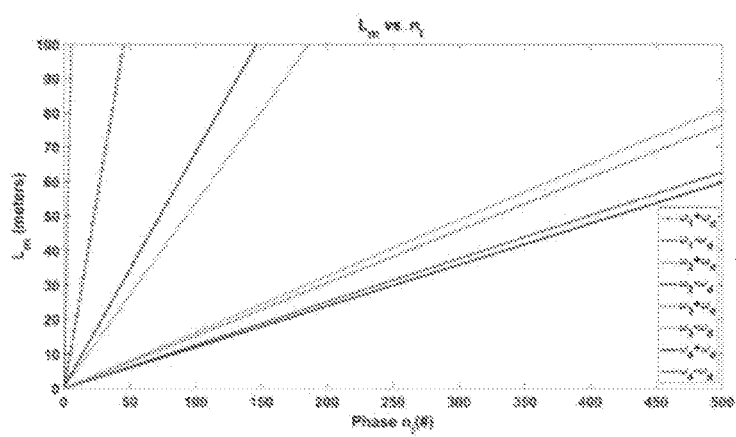
Figure 21B:
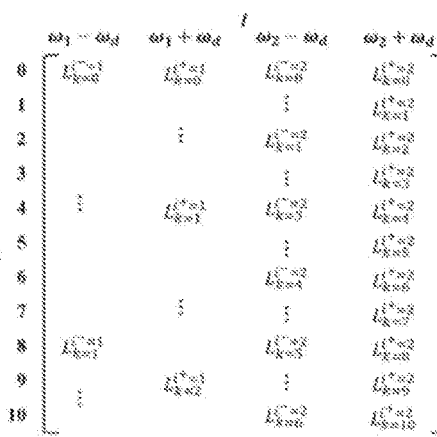

FIG. 21A shows a graph of measurement length results, $L_k^{\omega_i \pm \omega_d}$, after sweeping the phase repetition integer ($n_i$) up to 500 for each Doppler-shifted modulation frequency ($\omega_i \pm \omega_d$). FIG. 21B shows a representation of the first 11 rows of the $M_{k,l}$ matrix with 2 RF modulation tones with the calculated $L_k^{\omega_i \pm \omega_d}$ values. Blank spaces are repeating terms for k<10.

Figure 22:
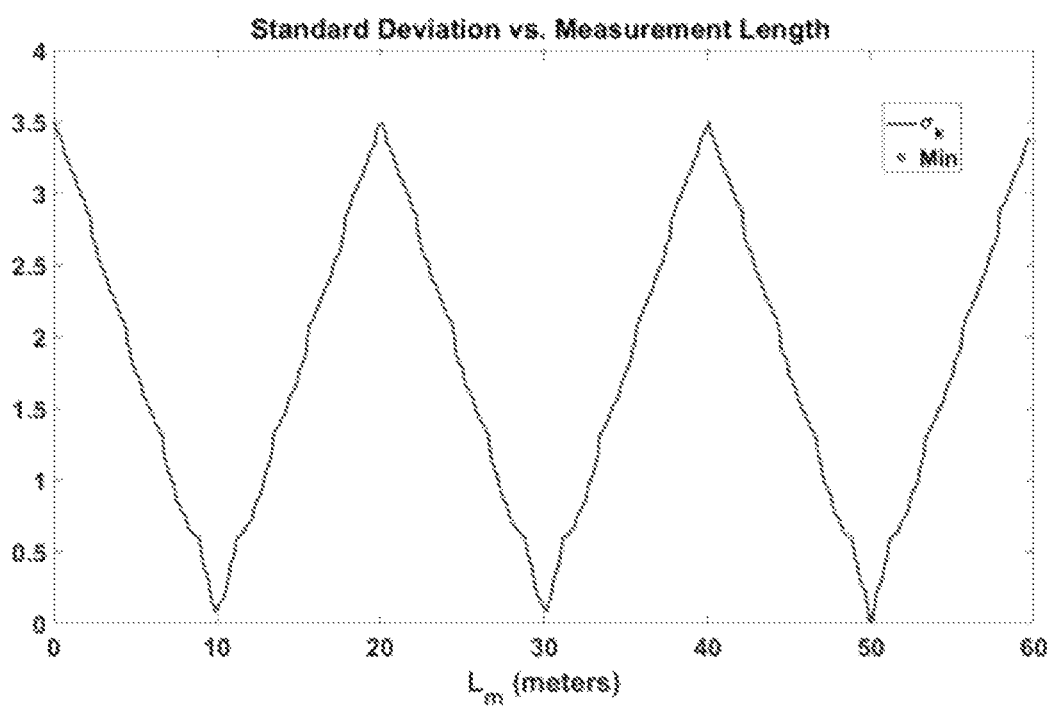

FIG. 22 shows a graph of standard deviation of the $k^{th}$ row of $M_{k,l}$ ($\sigma_k$) with respect to $L_m$ to find the distance of the target via triangulation. $L_m$ set to 50 m with a target speed of 108 km/h. The minimum $\sigma_k$ value is indicated in the figure.

Figure 23:
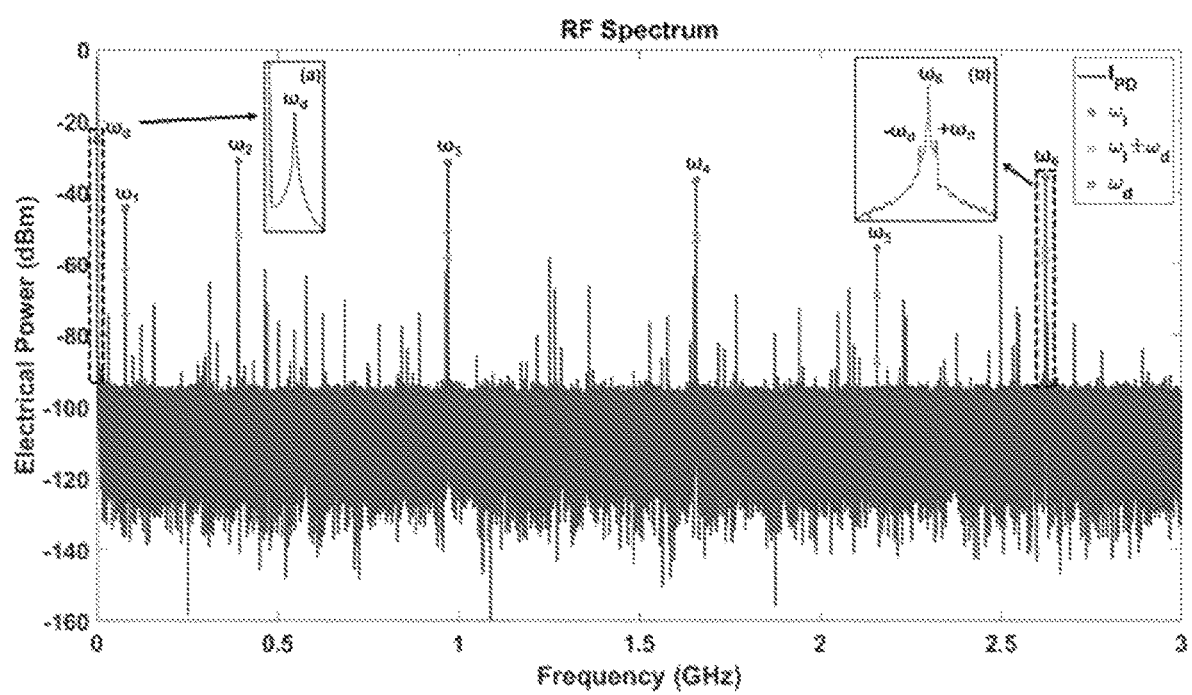

FIG. 23 shows a Measured resultant RF spectrum of the target moving with ~8 cm/s. 6 RF modulation frequencies are indicated on the spectrum. Insets (a) magnified Doppler spike near the baseband at 105 kHz, (b) magnified $\omega_6$ and its corresponding $\omega_6 \pm \omega_d$.

Figure 24:
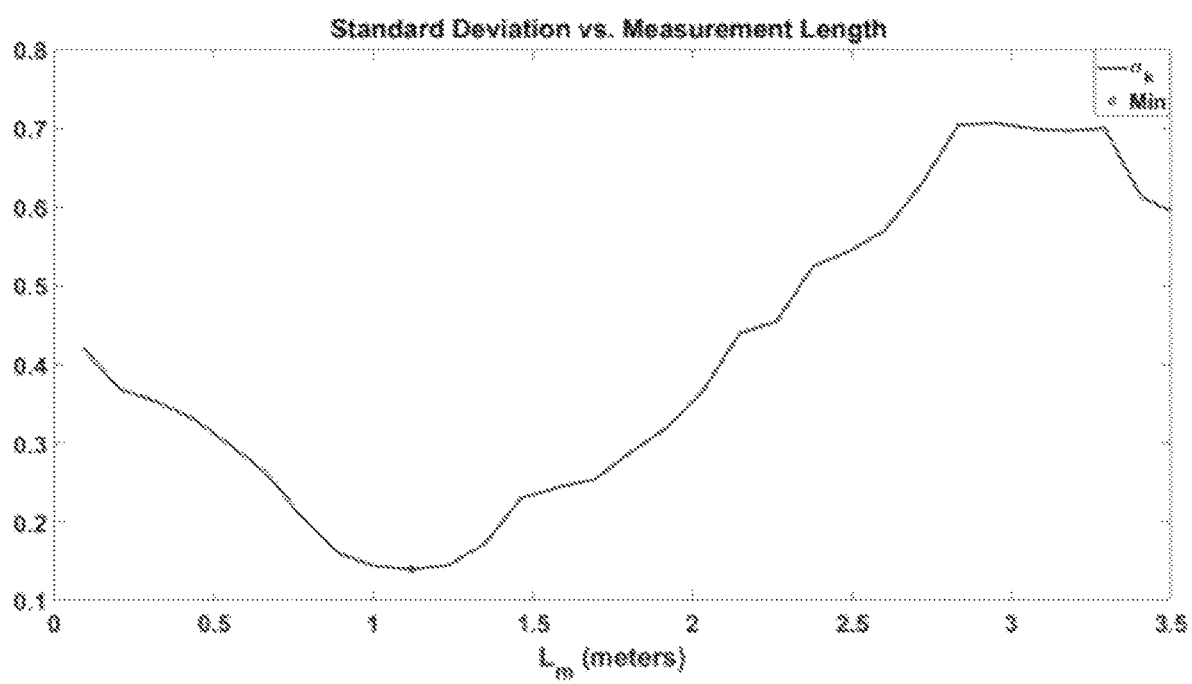

FIG. 24 shows a graph of $\sigma_k$ with respect to $L_m$ to find the distance of the target via triangulation. The minimum $\sigma_k$ value is indicated in the figure at $L_m$=111.9 cm.

Figure 25A:
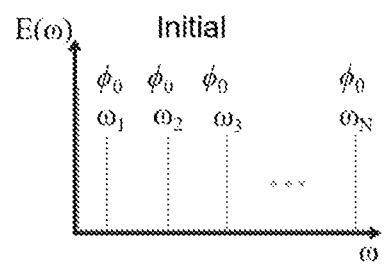
Figure 25B:
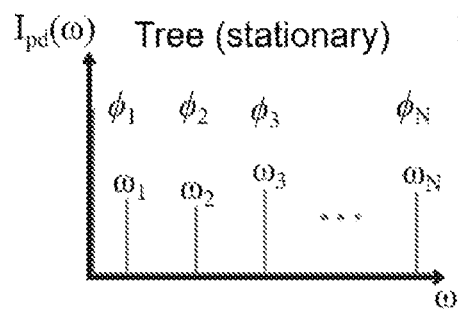
Figure 25C:
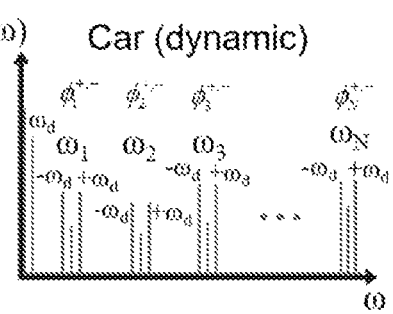

FIG. 25A shows an electric field spectrum of the laser after modulation with $\omega_1, \omega_2, \omega_3, \ldots \omega_N$ frequencies by a Mach-Zehnder modulator (MZM) before leaving the collimator. Each tone has an initial phase of $\varphi_0$ before ranging. FIGS. 25B-25C shows the resultant photocurrent ($I_{pd}$) spectra acquired after the collection of the echo light from a stationary tree and a car in-motion with a velocity (v), respectively. The tones accumulate different phases of $\varphi_1, \varphi_2, \varphi_3, \ldots \varphi_N$ with respect to the target distance $L_m$. In the case of the car, the optical carrier and the sidebands realize a Doppler frequency shift of $\omega_d$. $\phi_i^{+,-}$ represents the acquired phases of each Doppler-shifted modulation.

Figure 26:
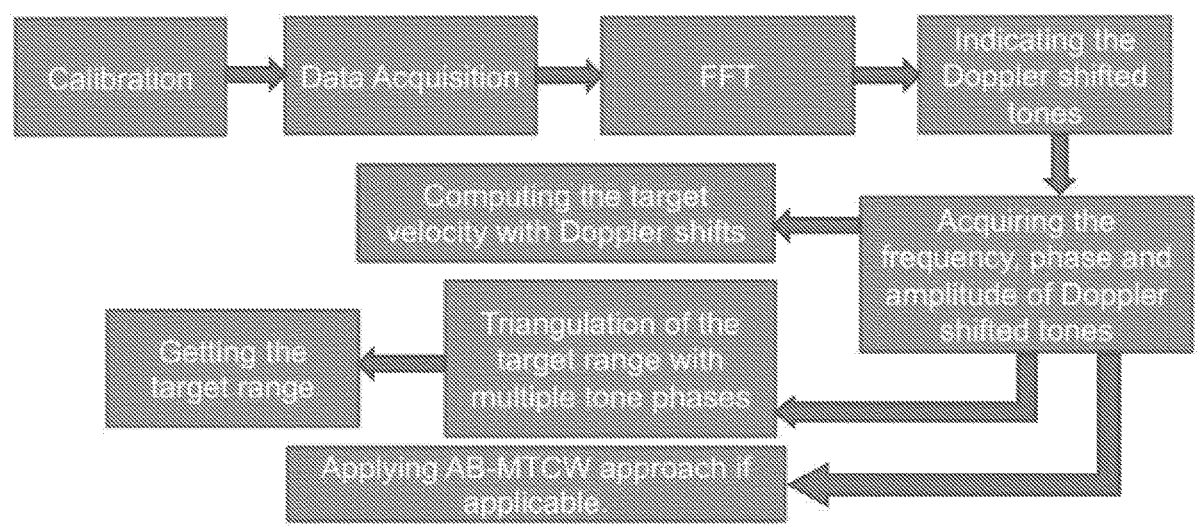

FIG. 26 shows a flow chart of a method for enhanced MTCW ranging with phase algorithms and velocimetry of the present invention.

Figure 27:
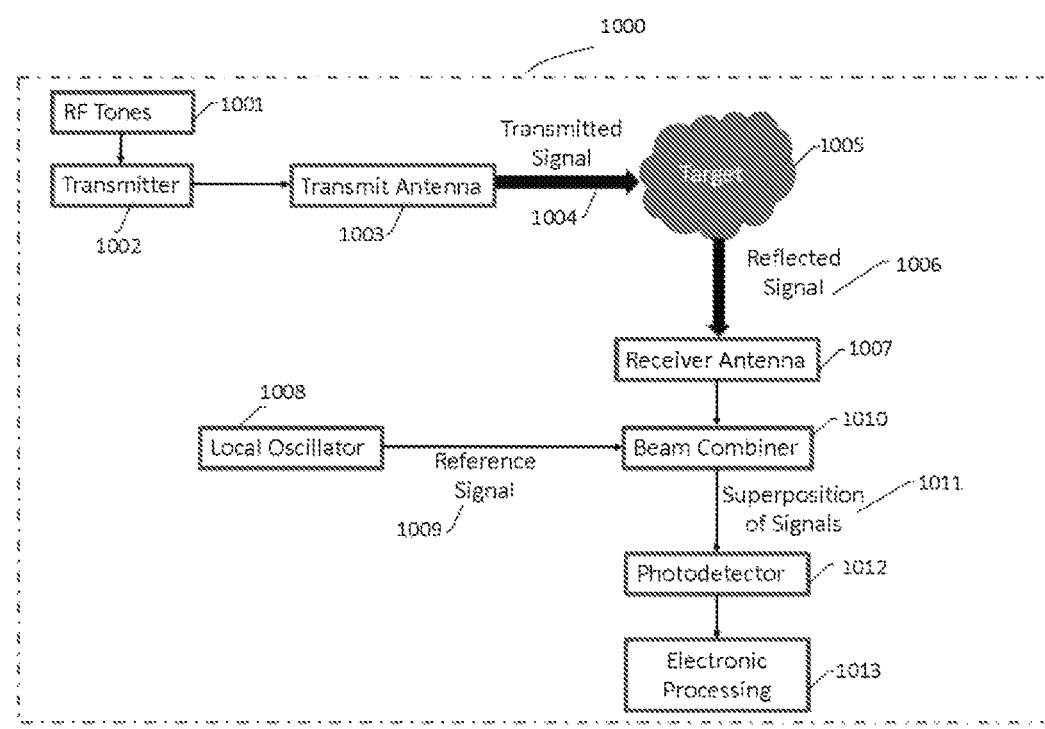

FIG. 27 shows a schematic of an alternate apparatus of the presently claimed invention.

FIG. 28 shows Eq. 1, which is the decoding expression for the generated photocurrent.

DETAILED DESCRIPTION OF THE INVENTION

Following is a list of elements corresponding to a particular element referred to herein:
- 103 apparatus
- 106 CW laser source
- 109 Mach-Zehnder modulator
- 112 summing amplifier
- 115 optical amplifier
- 118 collimator
- 121 beam splitter
- 203 apparatus
- 206 summing circuit
- 209 power splitter
- 212 single transmitter antenna
- 215 RF amplifier circuit
- 218 receiver antenna
- 221 amplifier circuit
- 224 summing amplifier
- 227 RF spectrum analyzer
- 300 system
- 303 CW laser
- 306 Mach-Zehnder modulator
- 309 beam splitter
- 312 optical switch
- 315 gated pump
- 318 collimator
- 321 frequency shifter
- 324 variable optical attenuator
- 327 collimator
- 330 beam splitter
- 336 heterodyne detection component
- 339 flat mirror
- 404 graph
- 409 graph
- 803 apparatus
- 806 CW laser
- 809 amplitude modulator
- 810 RF tone input
- 818 collimator
- 821 beam splitter
- 822 reference mirror
- 823 device boards
- 840 focusing lens
- 843 photodetector
- 844 analysis circuit
- 845 mirror
- 903 apparatus
- 906 laser source
- 907 laser
- 908 light
- 909 amplitude modulator
- 910 controller
- 911 photodetector
- 912 analysis system
- 1000 apparatus
- 1001 RF tones
- 1002 transmitter
- 1003 transmit antenna
- 1004 transmitted signal
- 1005 target
- 1006 reflected signal
- 1007 receiver antenna
- 1008 local oscillator
- 1009 reference signal
- 1010 beam combiner
- 1011 superposition of signals
- 1012 photodetector
- 1013 electronic processing The present disclosure invention has all the benefits of frequency modulated continuous wave (FMCW) LIDARs bundled in a faster and simpler system. The described systems utilize a continuous wave or a quasi continuous wave, rather than a pulsed, laser, or radio wave, and rely on interference techniques to generate highly sensitive measurements. MTCW RADAR can be a multi RF-tone modulated interferometric RADAR system. The received signal has various phase delays at different tones that are converted to intensity variation after combination through a summing amplifier. If the target is static, the modulation strength of detected RF tones can be used to extract range information. Modulation strength at a particular tone depends on the modulation frequency and the path length. For a fixed path length, the modulation strength at RF tones can vary sinusoidally.

Aspects of the present disclosure can, for example, be utilized for standalone small spacecraft technology to achieve small, affordable, and transformative approaches to enable remote sensing systems for littoral variables such as sea surface vector winds, sea surface height etc., without sacrificing performance metrics that are achieved in conventional space and airborne technologies. For example, a laser altimetry system can measure sea surface height based on multi-tone continuous wave detection and ranging. Accordingly, a frequency shifter can be used to shift a reference signal in order to account for a relatively constant velocity of a space or airborne system. This can correct Doppler shift and detect the range information directly. Further, satellite LIDARS can observe high loss due to long distances (>400 km), therefore short pulses with high peak power and low repetition rates can be generated to compensate for losses. These low repetition rate pulses also provide coarse measurement of range while high frequency RF tones provide fine measurement. Conventional altimetry relies on time of flight measurements that can give absolute accuracy of >10 cm at long range. The present disclosure is capable of measuring sea surface height from a CubeSat with less than 4 cm accuracy.

Some aspects involve determining the relative phase delay between different RF tones and converting these delays into RF tone amplitude variations then into precise measurements of the optical path. The system can use time of flight measurements for coarse measurement of the sea surface by integrating with a quasi-CW pulse. It can then incorporate RF tones to identify frequencies that experience constructive and destructive interferences for the given optical path. For instance, if a single RF tone is used, the tone frequency can be swept and catch peak(s) and valley(s) of the interference and detect the distance that results to $2\pi$ and $\pi$ phase changes via $\phi=2\pi f_{RF}\Delta t=2\pi f_{RF}2L/c$, where $f_{RF}$ is modulation frequency, L is the target distance and c is the speed of light. In some embodiments, a swept source can be utilized similar to FMCW systems. However, using a swept source might not be optimal for a moving system. A satellite can be moving at ~7.7 km/s speeds, and the flight time of the light is ~2.7 ms. The present disclosure describes systems that can collect the same information in a single shot measurement by facilitating several selected tones and later fitting the tone powers on a sinusoidal signal and finding an interference pattern.

In some embodiments, an initial signal can be generated using a sum of a number of initial RF modulation tones by either electro-optic modulators or direct modulation of the source. A signal emitter can emit the initial signal as a multi-tone continuous wave signal after the modulation. The signal emitter can emit a laser, or in other cases can emit radio waves or RF electromagnetic waves. In some cases, the multi-tone continuous wave signal can be a single shot multi-tone continuous wave signal, since distance and velocity of a target can be determined using such a single shot with the amplitude variations of initial RF tones. A reflected signal can be identified. For example, the reflected signal can be a version of the initial signal reflected from a target. A signal receiver can receive backscattered light to identify the signal. The signal receiver can include an RF antenna or a receiver lens. A number of resultant RF tones (e.g., corresponding to the initial RF tones) can be determined using the reflected signal. A respective one of the resultant RF tones can include a frequency, a phase and a power. A frequency-domain sinusoidal wave can be fitted to the resultant RF tones in the frequency domain. A distance to the target can be determined using the frequency of a sinusoidal modulation pattern fitted on the tone powers measured. A velocity of the target can be determined using a frequency shift between the initial RF tones and the resultant RF tones.

The received signals can acquire time delay while propagating to the target and back. Such time delay can create different phase delays for each RF tone. Received signal can be amplified and summed with the reference to convert the phase delays to intensity variations. If the received signal and the reference signal are in phase, constructive interference can give a maximum intensity. If they are out of phase, destructive interference can result in a minimum intensity. All other cases can make intermediate changes. By applying sinusoidal fitting algorithms to a number of RF tones, additional frequencies that observe constructive and destructive interference can be interpolated or calculated, even though the system does not transmit or receive all of the tones. The range information can then be determined from time of flight calculations.

In some embodiments, the signal emitter can include a laser source, a Mach-Zehnder modulator, and a beam splitter. The Mach-Zehnder modulator can output the initial signal as an amplitude modulated laser beam from inputs to the Mach-Zehnder modulator that include a laser beam from the laser source and the initial RF tones. The signal emitter can also include a beam splitter that splits the amplitude modulated laser beam into an emitted component and a reference component. The reference component can be recombined with the reflected signal to generate an interference pattern from the resultant RF tones. A frequency shifter can shift the reference component for source or target velocity compensation.

In some cases, wherein the laser source comprises a number of colored laser sources of respective colors, the initial signal can be emitted as initial laser beams corresponding to the respective colors, and the resultant signal can be received as resultant laser beams corresponding to the respective colors. This can be used for imaging, cartography, and other applications. A color of the target can be determined using a respective amplitude of each of the resultant laser beams corresponding to the respective colors. In some cases, the color lasers can be utilized along with a higher frequency laser to increase the accuracy of range finding while also determining color with the color lasers.

In radio embodiments, a summing circuit can output the sum of the plurality of initial RF tones to generate the initial signal, wherein the signal emitter comprises an antenna that emits the multi-tone continuous wave signal as electromagnetic waves such as radio waves. The signal emitter can include a power splitter that splits the initial signal into an emitted component and a reference component. Another summing amplifier or summing circuit can sum the reference component with the reflected signal to generate an interference pattern from the plurality of resultant RF tones. A frequency shifter can shift the reference component for velocity compensation.

Figure 1:
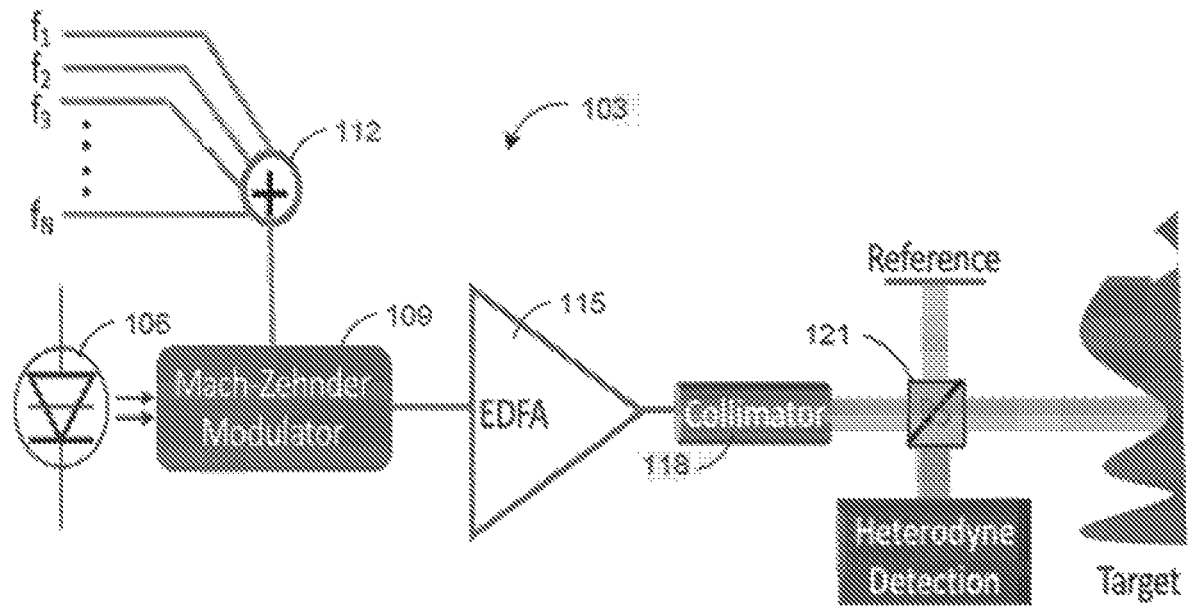
FIGS. 1-3 are drawings that illustrate example systems for multi-tone continuous wave detection and ranging, according to various embodiments.

FIG. 1 shows an apparatus 103 for laser- or LIDAR-based multi-tone continuous wave detection and ranging. A continuous wave (CW) laser source 106 can be modulated by several radiofrequency (RF) tones $f_1$-$f_N$ simultaneously via a Mach-Zehnder modulator (MZM) 109. In some cases, a summing amplifier 112 sums the RF tones and can input the summed signal into the MZM 109 to generate an amplitude or intensity modulated laser beam. In other cases, the MZM 109 can provide for input of multiple RF tones. The CW laser source 106 and the RF tones can be used as inputs to the MZM 109. The MZM 109 can output an amplitude or intensity modulated laser. In some cases, an output of the MZM 109 can be connected to an input of an optical amplifier 115 such as an Erbium-doped fiber amplifier (EDFA). The output of the optical amplifier 115 can be connected to an input of a collimator 118.

The modulated beam can be split into two components via a beam splitter 121; one component can be transmitted to the target, and the other is kept as a reference beam. After interaction with an object, the backscattered light from the first component can be recombined with the reference beam and generate an interference pattern, as described in further detail herein.

Each RF tone that modulates the CW laser can result in a unique phase shift (and resulting variation in intensity) of the interference pattern. Here, RF tones can be varied successively, and each resulting interference pattern can be directly mapped to the corresponding interference frequencies generated. These interference frequencies can be used to determine range as they are inversely proportional to the distance to the target.

This system can be modified to perform single-shot measurements. Here, several tones can be simultaneously used to modulate the beam, generating a chirped signal which has varying frequency. For a fixed path length, the modulation strength at RF tones can vary sinusoidally. The resulting interference patterns from each tone can be detected apart from one another to allow for single-shot measurement of distance. Such capability can be useful in dynamic environments, such as satellite LIDARs, where utilization of a swept source such as FMCW LIDAR is not possible due to the satellite's motion. Additionally, the system can also be adapted to perform velocity measurements. For example, the Doppler frequency shift of the individual RF tones can be measured in order to determine the speed and direction of object motion. An RF spectrum analyzer can be used to analyze the spectra to identify frequency shifts and other measures in the frequency domain. The RF spectrum analyzer can perform an analysis of the interference signal in the frequency domain in order to determine the distance to the target and the velocity of the target.

In some examples, the same initial summed signal can be utilized to amplitude modulate a plurality of different lasers of different colors. Red light lasers can have a wavelength of approximately or exactly 630-680 nm. Green light lasers can have a wavelength of approximately or exactly 532 nm. Blue light lasers can have a wavelength of approximately or exactly 445 nm. Yellow light lasers can have a wavelength of approximately or exactly 593.5 nm. Multiple lasers of multiple colors, for example, a red laser, a green laser, and blue laser, can be pointed at a similar target, and the backscatter can be received for all of the colors. The target can reflect its own color while absorbing other colors. Based on the relative strength of each received color, the color of the target can be determined. In some cases, the sine fitting or sinusoidal fitting can be used based on the relative amplitude of backscattered or resultant signal for the various wavelengths. By transmitting a few colors, the relative strength of other colors can be interpolated, calculated, or inferred. Even if the colors of the lasers are not directly matched with traditional RGB or CMYK standard, the RGB or CMYK color code can be determined based on the relative amplitude or intensities of backscattered light.

Figure 2:
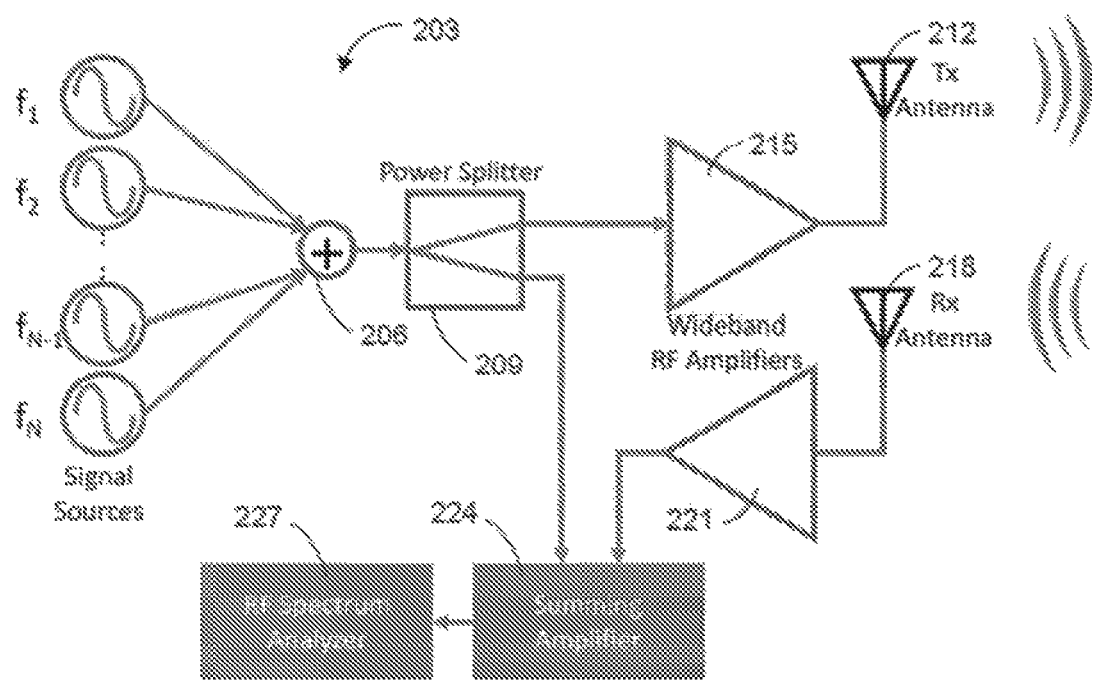

FIG. 2 shows an apparatus 203 for electromagnetic wave based multi-tone continuous wave detection and ranging. The figure shows that the concepts described herein are also applicable to radio detection and ranging (RADAR) applications. First, multiple radio frequencies $f_1$-$f_N$ can be summed up using a summing circuit 206 that includes, for example, a summing amplifier. A power splitter 209 can split the initially combined signal.

The power splitter 209 can output a portion of the combined signal as a reference signal. The combined signal can be transmitted from a single transmitter antenna 212. In some cases the signal can be amplified in an RF amplifier circuit 215. The transmitted signal can reflect and scatter from the targets around. These backscattered signals can be collected with the receiver antenna 218. In other examples, a single antenna can be used for transmission and reception. The received or resultant signal can be an output from the receiver antenna 218 to an RF amplifier circuit 221. The resultant signal can be combined or summed with the reference signal (the initial signal) within a summing amplifier 224. This can result in an interference signal. The RF spectrum analyzer 227 can perform an analysis of the interference signal in the frequency domain in order to determine the distance to the target and the velocity of the target.

The system can be described using separate transmitter and receiver antennas. In some cases where a single transceiver antenna is used, it can be followed by a circulator to separate transmitted and received signals. In some examples, a receiver antenna array can be utilized, which includes individual receiver antennas employed to detect each RF tone. Such arrangement can also eliminate the need for wideband amplifiers.

Figure 3:
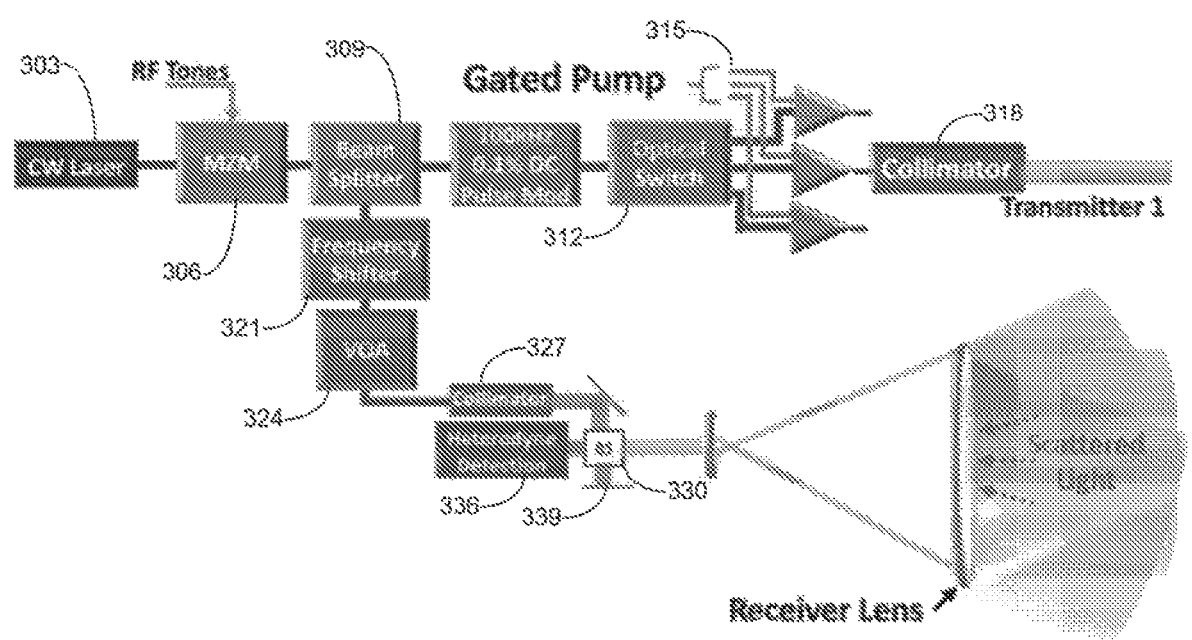

FIG. 3 is a drawing that illustrates another laser-based multi-tone continuous wave system 300. A continuous wave (CW) laser 303 can be modulated with several RF tones, for example, using a Mach-Zehnder modulator (MZM) 306, and then split into reference and transmit components by a beam splitter 309. The transmit component can be pulse modulated and directed through an optical switch 312. A gated pump 315 can output to a collimator 318 for transmission. The beam splitter 309 can output the reference component to a frequency shifter 321 and variable optical attenuator (VOA) 324 that shifts the reference component to compensate for a velocity of the system. The reference components can be directed through a collimator 327 and a beam splitter 330. Backscattered light can be directed through a receiver lens, through the beam splitter 330, and into heterodyne detection component 336.

The CW laser can, for example, include a 1064 nm laser, such as an (neodymium-doped yttrium aluminum garnet; Nd:Y3Al5O12) Nd:YAG solid state laser, or a semiconductor laser, or a fiber laser. The transmit component can be further modulated with a pulse that has a 100 kHz repetition rate, a 10 ns pulse width (0.1% duty cycle), and is beamed to the Earth's surface. The transmitted light can be scattered from the atmospheric particles and sea surface and come back to a CubeSat with information related to atmospheric and oceanographic information. This can be summed with, and can interfere with, the reference signal similar to heterodyne detection. Due to the propagation, individual tones will experience different phase shifts and interference with the reference arm. For instance, a 1 GHz tone and the fundamental optical carrier can have 180 degree phase difference after a 30 cm propagation in free space. At the detector, the phase difference of RF tones can convert to intensity changes at the RF domain (i.e. modulation index).

Figure 4:
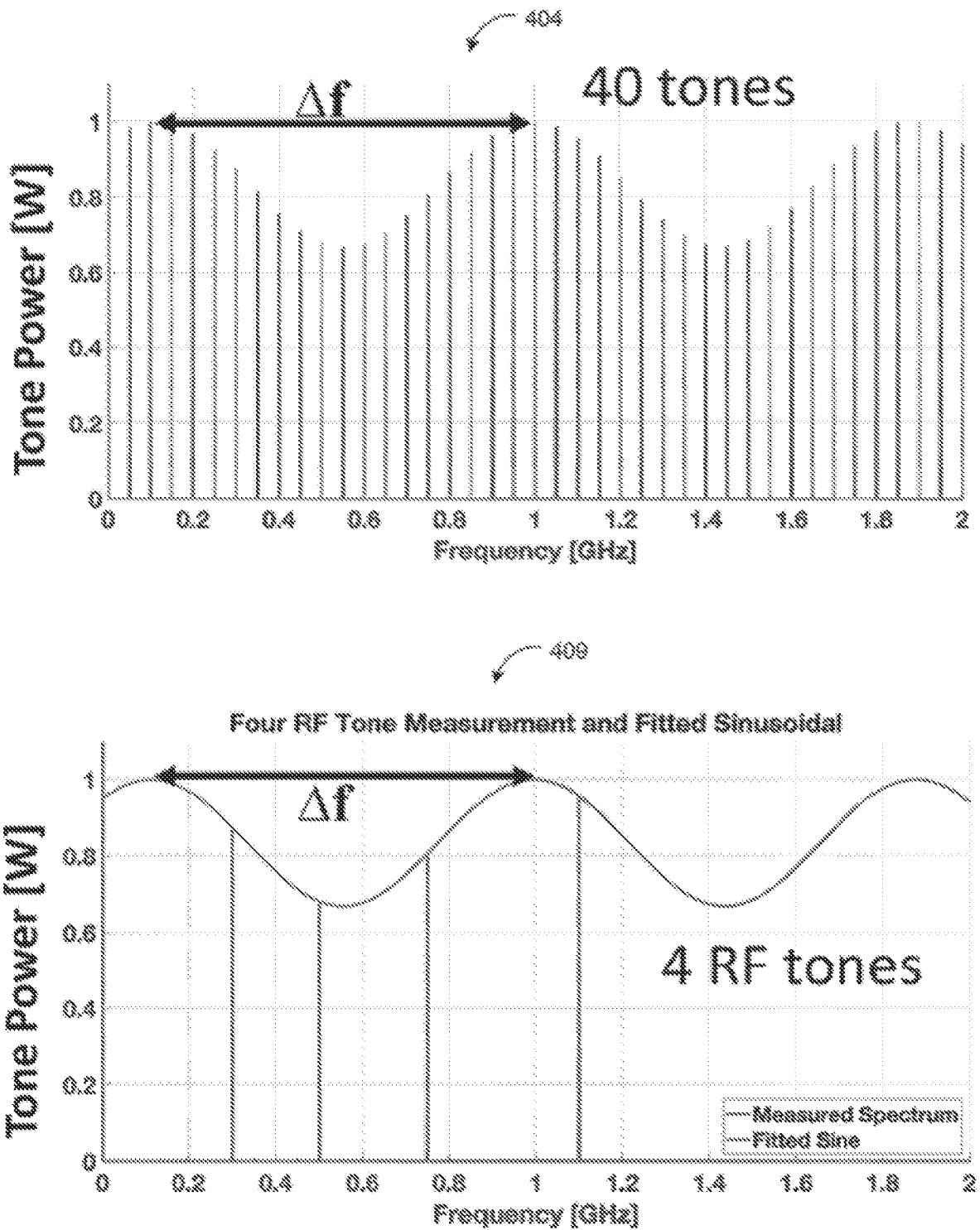

FIG. 4 includes a graph 404 that shows an example where 40 tones are utilized. This graph 404 can represent the interference signal in a MTCW detection and ranging system that uses 40 tones. However, aspects of the present disclosure simplify the system such that this number of tones do not need to be utilized. For example, a sine fitting algorithm or sinusoidal fitting algorithm can be used to interpolate or calculate the 40 tones based on 4 or even fewer RF tones. The photocurrent of an individual RF tone at the detector is proportional to: $I_{RF}=\cos(2\pi f_{RF}t+2\pi f_{RF}(2\Delta L/c))$ where $\Delta L$ is the path difference in interferometer. Photocurrent is periodic with respect to the RF frequency and also to the distance. The graph uses multiple tones to detect the range of the target by using sine fitting. Graph 404 illustrates RF a power of 40 RF tones RF tones at the detector that can reveal range information. Graph 409 shows a fitted sine wave based on 4 RF tones. Once a sine fitting algorithm determines the sine wave, and the shift of the 4 RF tones are compared to the original or initially transmitted signal, the amplitude and frequency of each of the 40 RF tones of graph 404 can be interpolated based on the fitted sine wave and a shift of a respective one of the 4 RF tones from graph 409.

FIG. 5A includes a graph that shows an example interference signal in the frequency domain. In this example, the distance is zero. At zero distance, all tones are in-phase and constructively interfere. Therefore, all tone powers are equal as shown in RFSA (left) and Oscilloscope (right).

FIG. 5B includes a graph that shows an example interference signal in the frequency domain. In this example, the propagation distance is 20 cm. 1.5 GHz modulation can be observed after fitting to tone powers (left). Corresponding oscilloscope data is also provided (right).

FIG. 5C includes a graph that shows an example interference signal in the frequency domain. In this example, the propagation distance is 40 cm. After 40 cm propagation ($\Delta L=20$ cm), the interference pattern generates $\Delta f=c/(2\Delta L)=$ 750 MHz modulation (left). Corresponding oscilloscope data for some tones is also provided (right).

FIG. 5D includes a graph that shows an example interference signal in the frequency domain. In this example, the propagation distance is 60 cm. After 60 cm propagation ($\Delta L=30$ cm), the interference pattern generates 500 MHz modulation (left). Corresponding oscilloscope data for some tones is also provided (right).

Figure 6:
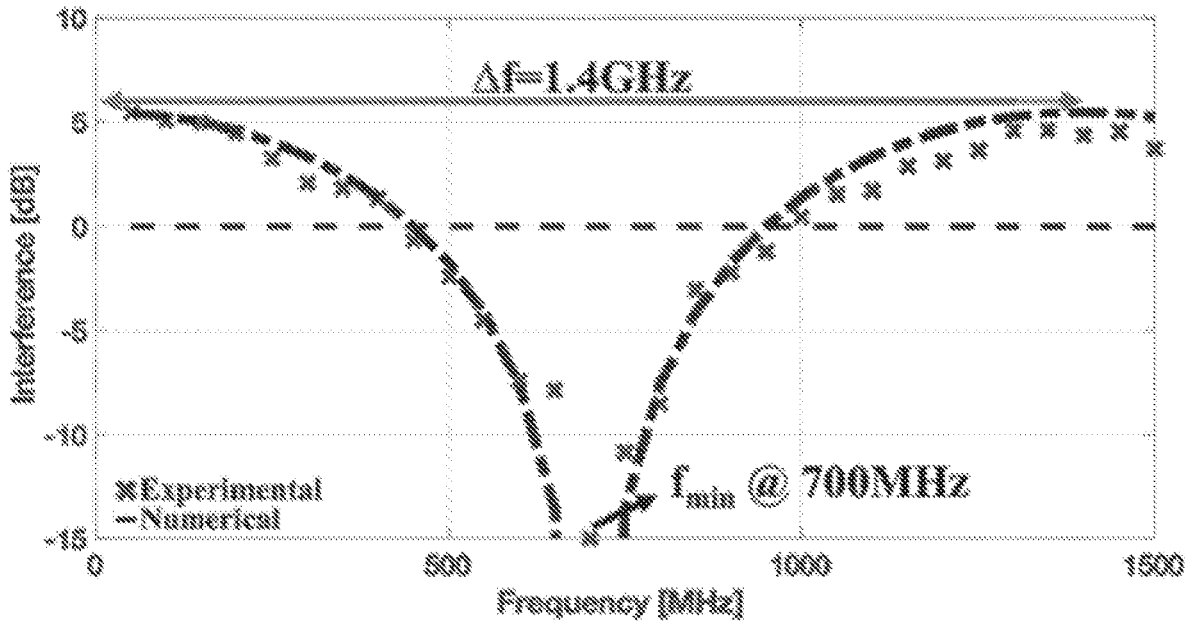

FIG. 6 includes a graph where, for a fixed distance, RF frequency is swept and interference behavior is observed. The figure demonstrates two peaks at DC and 1.4 GHz with a valley at 700 MHz, indicating that $\Delta L=c/2\Delta f=10.71$ cm. It can be observed that the experimental data is well matched with numerical expectation.

Figure 7:
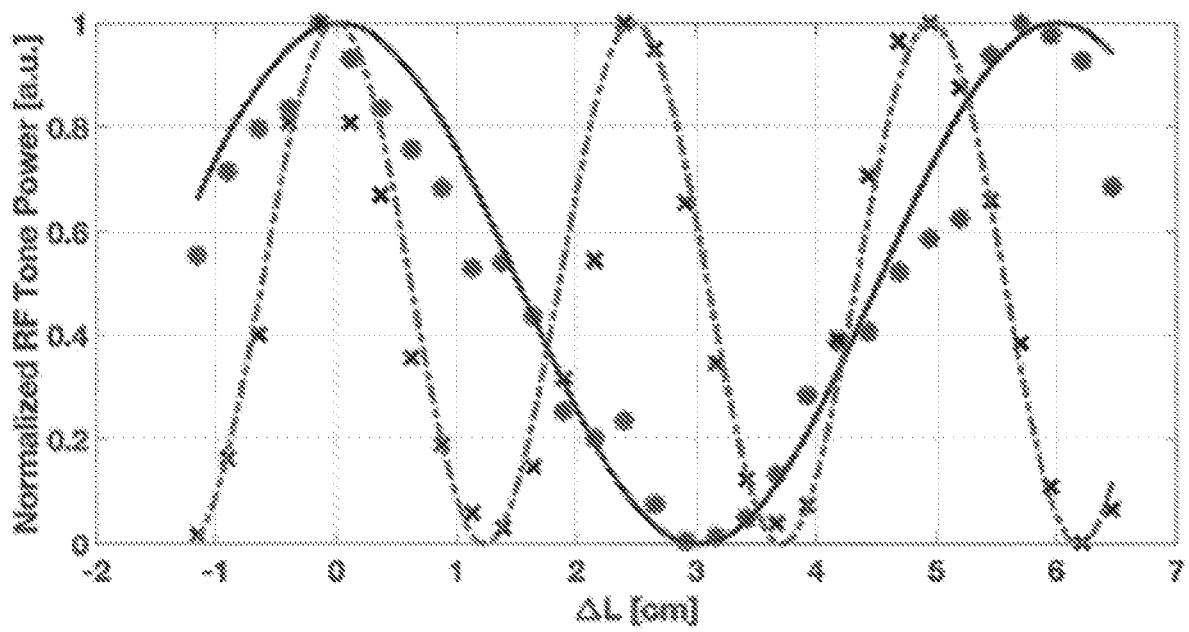

FIG. 7 includes a graph where the optical carrier is modulated by two RF tones (2.5 GHz and 6 GHz) and measurement arm is moved to observe interference. The figure shows that 2.5 GHz and 6 GHz tones are forming waveforms with 6 cm and 2.5 cm periods respectively. Here, it can also be observed that the experimental data can match with the theoretical expectation $\Delta L=c/2\Delta f$.

Figure 8:
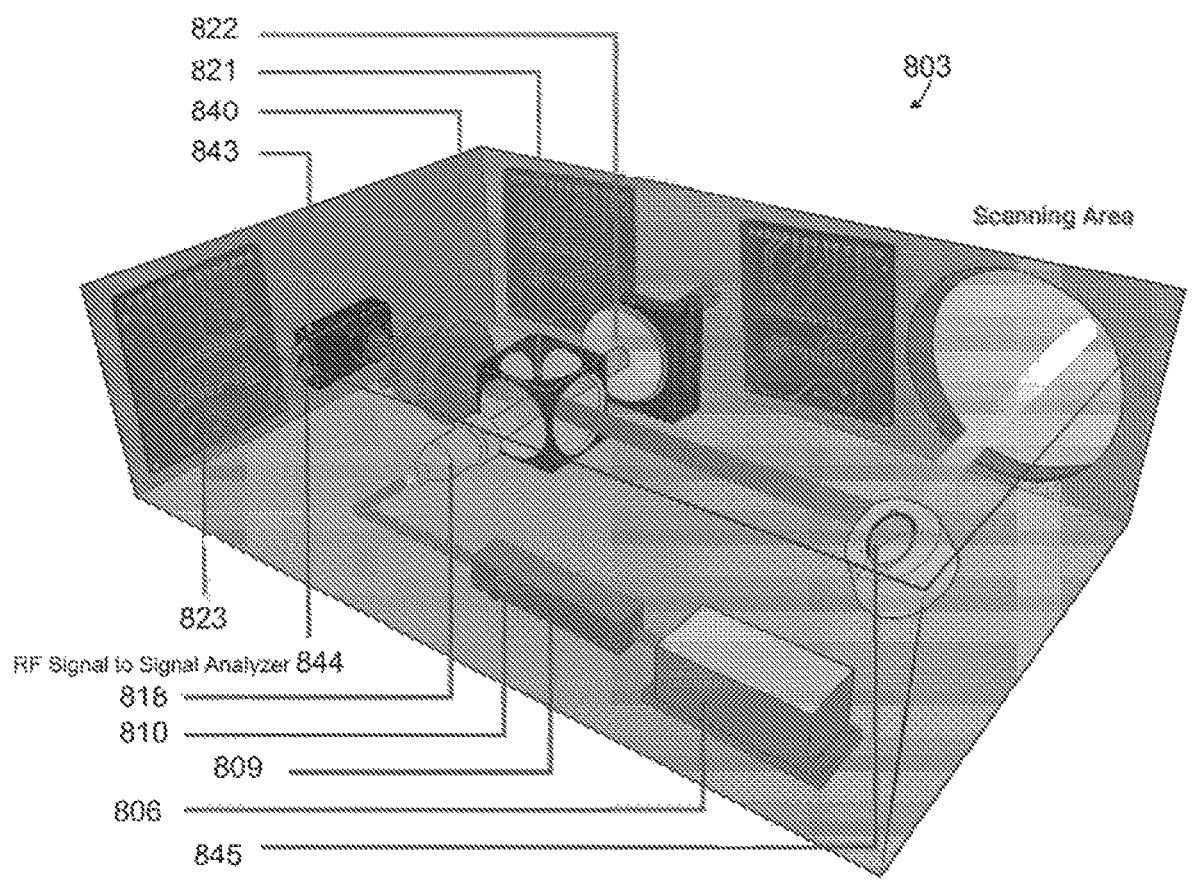
FIG. 8 is another example system for multi-tone continuous wave detection and ranging, according to various embodiments.

FIG. 8 shows an example of a system or apparatus 803 for multi-tone continuous wave detection and ranging. A Laser, LIDAR, or RADAR based system can be utilized. A continuous wave (CW) laser source 806 can be modulated by several radiofrequency (RF) tones using an amplitude modulator 809. The CW laser source 806 and an RF tone input 810 can be used as inputs to the amplitude modulator 809. The amplitude modulator 809 can output an amplitude or intensity modulated laser. The amplitude modulated laser can be input to a collimator 818. One or more apparatus 803 can be mounted on a vehicle or autonomous vehicle such as an automobile, an aircraft, a drone, a UAV, a hazardous location rover vehicle, or a space rover vehicle.

The modulated beam can be split into two components via a beam splitter 821 such as a cube beam splitter as shown; one component can be transmitted to the target, and the other is kept as a reference beam using a reference mirror 822. The apparatus 803 can also include one or more device boards 823 or device driver boards. After interaction with an object, the backscattered light from the first component can be recombined with the reference beam and generate an interference pattern, as described in further detail herein.

Each RF tone that modulates the CW laser can result in a unique phase shift (and resulting variation in intensity) of the interference pattern. The result can be fed through a focusing lens 840 and input into a photodetector 843. An RF signal can be generated by the photodetector 843 and provided to an analysis circuit 844, which can be separate from or included in the apparatus 803. The analysis circuit 844 can be included in one or more device boards 823. The beams can be emitted and subsequently detected through a mirror 845 such as a scanning mirror.

The analysis circuit 844 can include a combination of one or more of the items such as a spectrum analyzer, a phase detector and an amplitude detector. In some cases, the analysis circuit 844 can include an in-phase and quadrature (IQ) demodulator that can be used for multi-tone continuous wave detection and ranging systems. Integration of the IQ demodulator can enhance the multi tone continuous wave technique by decreasing the computation requirements. A radio frequency IQ demodulator can detect the tone powers in analog domain and eliminate the need for high speed sampling. IQ demodulator can achieve direct detection of desired RF tone's phase and amplitude, thereby reducing data size and memory requirements.

Several tones can be simultaneously used to modulate the beam, generating a chirped signal which has varying frequency. For a fixed path length, the modulation strength at RF tones can vary sinusoidally after interfering with a modulated local oscillator. The resulting interference patterns from each tone can be detected apart from one another to allow for simultaneous (rather than successive) measurement of distance. Such capability can be useful in dynamic environments, such as vehicles, satellite LIDARs, where repetitive measurement of the same target location is not possible due to the target's motion. Additionally, the system can also be adapted to perform velocity measurements. For example, the Doppler frequency shift of the individual RF tones can be measured in order to determine the speed and direction of object motion. An RF spectrum analyzer or a Fourier analysis of time domain signal can be used to analyze the spectra to identify frequency shifts and other measures in the frequency domain. The RF spectrum analyzer or a Fourier transform allows an analysis of the interference signal in the frequency domain in order to determine the distance to the target and the velocity of the target.

Such an apparatus 803 can achieve high accuracy point cloud formation. A point cloud can refer to a set of data points defined in three dimensional space. In some cases, each point in three dimensional space can be identified based on a distance identified using multi-tone continuous wave detection and ranging, in combination with a known location of the apparatus 803, and the direction a multi-tone modulated signal is emitted. To this end, the apparatus 803 can take a distance measurement, record a point in three dimensional space. The apparatus 803 can sequentially or concurrently make a number of distance measurements and record a number of points in three dimensional space to form a point cloud. In some cases, a mirror angle of the mirror 845 can be modified for each measurement, in order to scan a particular area. The mirror angle can be used to identify the direction a multi-tone modulated signal is emitted and subsequently detected.

This process can be integrated with artificial intelligence for license plate and traffic sign recognition. For example, a license plate or a traffic sign can include raised characters, and the apparatus 803 can detect distance measurements, form a point cloud, and identify the characters in the license plate based on the resulting point cloud. In addition, where a license plate or traffic sign is flat, but the letters include a contrasting color, the colored laser process can be utilized to identify characters of the license plate or traffic sign.

Figure 9:
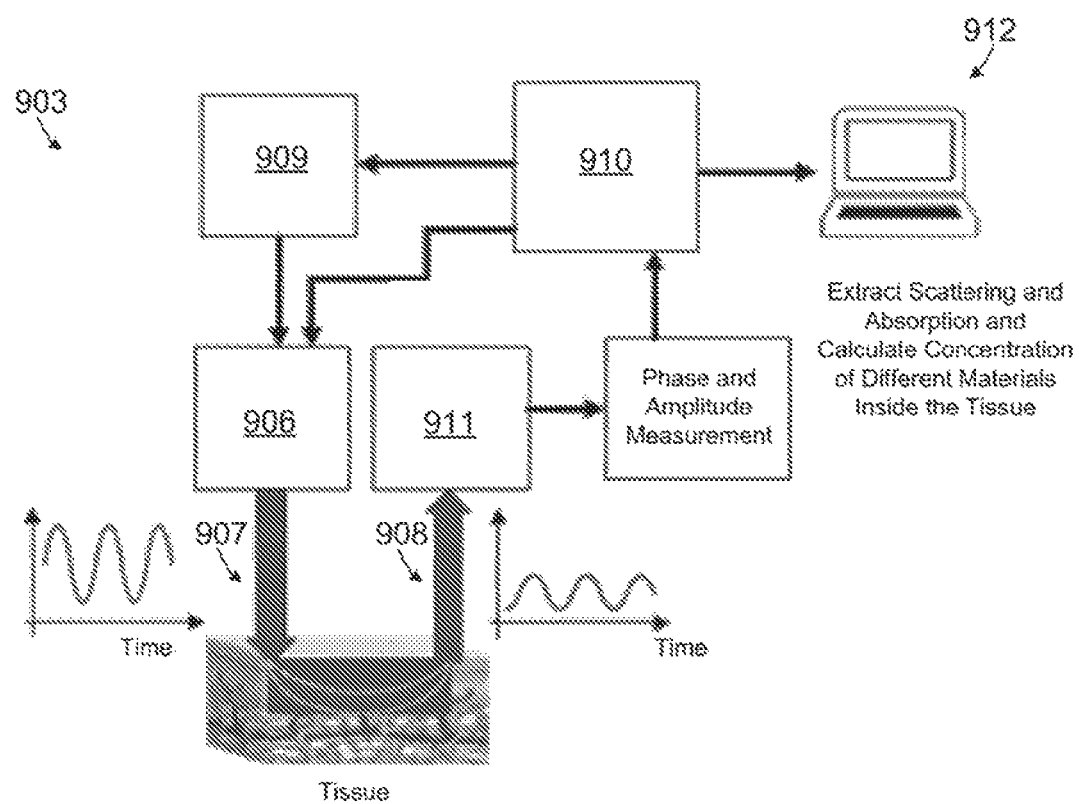
FIG. 9 is another example system for multi-tone continuous wave detection and ranging, according to various embodiments.

FIG. 9 shows another example of a system or apparatus 903 for multi-tone continuous wave detection and ranging for medical applications such as low-coherence interferometry, optical coherence tomography (OCT), diffuse optical tomography (DOT), and diffuse optical imaging (DOI).

The apparatus 903 can include a laser source 906 such as a low-coherence laser source. A laser 907 from the laser source 906 can be modulated by several radiofrequency (RF) tones using an amplitude modulator 909. The laser source 906 and an RF tone input 910 can be used as inputs to the amplitude modulator 909. The controller 910 can control the laser source 906 and the amplitude modulator 909 to modulate the laser 907 with selected radiofrequency (RF) tones. The modulated laser 907 can be emitted into organic or biological tissue. For medical applications such as low-coherence interferometry, a reflected laser and other light 908 can be detected by photo detector 911. An amplitude and phase measurement can be identified and provided to the controller 910. The controller 910, and an analysis system 912 can extract scattering and absorption to calculate concentrations of different materials inside the tissue. The analysis system 912 can include a spectrum analyzer. In some cases, the analysis system 912 can include an in-phase and quadrature (IQ) demodulator which can be used for multi-tone continuous wave detection and ranging systems. Integration of the IQ demodulator can enhance the multi tone continuous wave technique by decreasing the computation requirements. A radio frequency IQ demodulator can detect the tone powers in analog domain and eliminate the need for high speed sampling. Any of the operations described herein can be expressed as software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices. The computing devices can include processor-based systems with one or more processors.

Referring now to FIGS. 10A-10B, the present invention additionally offers devices and methods for a LIDAR system that eliminates the need for frequency sweeping, amplitude sweeping, and phase sweeping, provides simultaneous range and velocity measurements of static and dynamic targets with high precision and resolution, and allows for ranging beyond the coherence length of CW LIDAR systems. This is achieved through use of phase-based multi-tone continuous wave (PB-MTCW) LIDAR. This technique eliminates the need of phase or frequency sweeps to get single-shot results. A CW laser is modulated by multiple radio-frequency (RF) tones such that each tone accumulates a different phase. In some embodiments, the CW laser may be split into two arms, wherein one is modulated by the multiple RF tones. Using the relative phase and frequency information of the reflected tones, the PB-MTCW system generates the target location, while the Doppler effect is implemented on the plurality of reflected tones to yield the target speed. In some embodiments, beating with the local may yield tones and phases, and a post-processing algorithm may generate the range and velocity information. In some embodiments, algorithms are implemented to eliminate common noise terms to allow ranging beyond the coherence length of a CW laser.

The CW laser may operate at 1000 to 1100 nm with 75 to 100 kHz linewidth and about 1 km coherence length. Or the CW laser may have broader linewidth and perform ranging beyond the coherence length with improved detection algorithms. The system that implements the PB-MTCW LIDAR method may further comprise a common clock that may trigger the RF synthesizers and the oscilloscope or data-acquisition board, and a calibration mirror placed at known location to calibrate the system for initial phases if the initial phase information is needed. The ranging system is scalable and can operate any other wavelengths of electromagnetic radiation from microwaves to optical and beyond with a proper selection of components.

Referring now to FIGS. 10B-10C, for a stationary target, the post-processing algorithm may comprise interpolation of the time domain data to improve resolution, phase preserving digital filtering to get the individual tone information, and inspection of the Fourier transform to get the Doppler shift (if any). The algorithm may further comprise phase comparison with a digital 0 phase cosine wave to get the phase, computing the initial target distance ($L_0^{i,j}$) value with the acquired tone phases, and triangulation of the actual target range. The triangulation may comprise finding an initial distance through phase and frequency differences between tones (see FIG. 10E). Integer n should be found to generate actual target distance. For N RF tones, there may exist $$\binom{N}{2}$$

combinations that can yield $L_0^{i,j}$, the residual length. In particular, for a given $\Delta\phi_{i,j}$, phase difference of two tones, and $\Delta\omega_{i,j}$, frequency difference of $i^{th}$ and $j^{th}$ tones, the total length will be $L_m = nL^{i,j} + L_0^{i,j}$, where the spatial period is $L^{i,j} = 2\pi c/\Delta\omega_{i,j}$ and the residual length is $L_0^{i,j} = c\Delta\phi_{i,j}/\Delta\omega_{i,j}$. The values of n are digitally swept and a data matrix $M_{k,l}$ may be established (see FIG. 10D). $M_{k,l}$ may have the possible combinations acquired from all phase differences. The standard deviation of each column of $M_{k,l}$ may be calculated as $$\sigma_k = \sqrt{\left(\sum_{r=1}^{l}(M_{k,r} - \overline{M_k})^2/l\right)},$$

and the row that yields the minimum standard deviation point and its corresponding $\overline{M_k}$, mean value of the row, may point out the actual target distance. In other embodiments, it is possible to acquire the target range with different algorithms using the relative phase and frequency differences of the RF tones.

Referring now to FIG. 12B, for a dynamic target, the post-processing algorithm may comprise performing a Fourier Transform to determine the shifted frequency values and the amount of Doppler frequency shift by inspecting the vicinity of the baseband and the known tone values. The velocity Doppler relation is $v = (\omega_d/\omega_0)(c/2)$, wherein v represents velocity, $\omega_d$ represents a Doppler shift, and c represents the speed of light. For N tones, there may be $$\binom{2N}{2}$$

combinations by including both up and down shifted Doppler frequencies that can yield $L_0^{i,j}$ for triangulation.

Referring now to FIGS. 15A-15B and 16, this PB-MTCW LIDAR system and method may be implemented for RADAR technology or GPS technology for detection, measurement, and localization.

The present invention features a system to range fast-moving targets with light detection and ranging principles ("LIDAR"). The system may comprise a remote target, a multi-tone continuous-wave light detection and ranging device ("MTCW LIDAR"), and a photodetector.

The system may further comprise a frequency ("FT") analyzer and a post-processor, which may comprise a decoding expression; and a bin phase table.

The MTCW LIDAR may generate a plurality of optical probe tones near a center wavelength of light, and the MTCW LIDAR may launch a copy of the plurality of optical probe tones toward the remote target.

The MTCW LIDAR may receive an image of the copy of the plurality of optical probe tones reflected from the remote target, and the MTCW LIDAR may superpose the plurality of optical probe tones with the reflected image of the copy of the plurality of optical probe tones upon the photodetector.

The FT analyzer may convert a record of the time-domain output of the photodetector into an equivalent frequency-domain spectrum, and the FT analyzer may be an analog, a digital, or a mixed analog and digital spectrum analyzer.

Frequency bins in the frequency-domain spectrum may be queried for their phase information at the bin indices implied by the decoding expression, and the amplitude, phase, and frequency of the frequency-domain spectrum bins may be analyzed in order to populate the bin phase table.

The values in the bin phase table may imply both the distance from the MTCW LIDAR to the remote target, and the relative velocity between the MTCW LIDAR and the remote target.

In some embodiments of the MTCW LIDAR, the decoding expression for the generated photocurrent is given in Eq. (1) shown in FIG. 28, where $A_{ref}$ and $A_m$ are the field amplitudes of reference and measurement arms, respectively, R is the responsivity of the PD, m is the modulation depth, $\omega_i$ is the $i^{th}$ tone frequency and $\omega_d$ is the induced Doppler shift.

The present invention features a complementary phase detection algorithm to enhance the capabilities of the amplitude-based MTCW LIDAR for single-shot simultaneous ranging and velocimetry measurements. As in the amplitude-based MTCW approach, the range information of the target is stored in the phases of the individual RF tones. Here, instead of focusing on the amplitude variations, the phase of the RF tones for stationary targets and Doppler-shifted RF tones for dynamic targets and the amount of the induced Doppler frequency shift can be used to extract the range and velocity information, simultaneously. Specifically, the distribution of tones, their phases, and the amplitude information, and how these can be utilized enhance the single-shot measurements. Combined with quasi-CW signals that facilitate coarse time of flight measurements, the present invention can give high resolution ranging limited by the maximum tone frequency and temporal resolution of detection electronics irrespective of the target distance. The resolution can be further enhanced by using prediction algorithms, improved electronics and faster modulation tones. Moreover, the proposed approach has the potential to mitigate the requirement for a narrow linewidth laser for coherent detection, since the present invention uses the relative phase changes of RF tones instead of absolute phase and frequency measurements as a means to determine the target range. Furthermore, this technique eliminates the power-balance requirements in between the local oscillator and the echo signal, which forces the system to have an integrated monitoring photodetector and a variable attenuator to realize the power balance.

The schematic of the enhanced MTCW LIDAR with phase algorithms for fast target ranging and velocimetry is presented in FIG. 17. A narrow linewidth CW laser with an output electric field of $E_1$ is modulated via an amplitude modulator such as the balanced Mach-Zehnder modulator (MZM) under push-pull configuration. Multiple RF tones, $f_i$, with the same initial phases are fed to the MZM that yields optical field, $E_2$, at the output facet of the collimator (CL). The modulator is configured to have a linear modulation with a low modulation depth of m<<1 and the corresponding $E_2$ is shown in Eq. (2):

$$E_2 = \frac{A_0}{\sqrt{2}} \exp(j\omega_0 t + j\phi_0) - \frac{mA_0}{4\sqrt{2}} \sum_{i=1}^{N} (\exp[j(\omega_0 + \omega_i)t + j(\phi_0 + \phi_i)] + \exp[j(\omega_0 - \omega_i)t + j(\phi_0 - \phi_i)]) \quad (2)$$

Here, $A_0$, $\omega_0$, and $\phi_0$ represent the electric field amplitude, angular optical carrier frequency, and the initial phase of the CW laser, respectively. Similarly, $\omega_i$ indicates the angular frequency of $i^{th}$ RF modulation tone, and $\phi_i$ is the initial phase of the corresponding tone.

The laser beam is then split into two via a beamsplitter (BS), where one arm is kept as the local oscillator with modulation and the other as the measurement branch to realize coherent detection on the photodetector (PD). The local signal is transmitted to the reference mirror that is separated from the BS by a distance $L_{ref}$. The back-reflected signal from the reference mirror accumulates a phase with respect to the corresponding frequency and has the field equation $E_{ref}$ as given in Eq. (3), where $\alpha_{ref}$ is the linear attenuation coefficient realized in the reference arm and c is the speed of light.

$$E_{ref} = \frac{A_0}{2\sqrt{2}} \alpha_m \exp\left(j\omega_0 t + j\omega_0 \frac{2L_{ref}}{c} + j\phi_0\right) - \frac{mA_0}{4\sqrt{2}} \alpha_{ref} \sum_{i=1}^{N} \left(\exp\left[j(\omega_0 + \omega_i)t + j(\omega_0 + \omega_i)\frac{2L_{ref}}{c} + j(\phi_0 + \phi_i)\right] + xp\left[j(\omega_0 - \omega_i)t + j(\omega_0 - \omega_i)\frac{2L_{ref}}{c} + j(\phi_0 - \phi_i)\right]\right) \quad (3)$$

The electric field in the measurement branch is represented by $E_m$, where the target speed, v, alters the echo signal by inducing Doppler shift, $\omega_d$, to the optical carrier frequency by $\omega_d=(2v/c)\omega_0$ after the laser beam travels a distance of $L_m$. Similarly, each modulation frequency realizes a Doppler shift of $\phi_d^i$, as well. The returned signal electric field equation after the completion of the round trip is shown in Eq. (4).

$$E_m = \frac{A_0}{2\sqrt{2}} \alpha_m \exp\left(j(\omega_0 + \omega_d)t + j\omega_0 \frac{L_m}{c} + j(\omega_0 + \omega_d)\frac{L_m}{c} + j\phi_0\right) - \frac{mA_0}{4\sqrt{2}} \alpha_m \sum_{i=1}^{N} \left(\exp\left[j(\omega_0 + \omega_i + \omega_d + \omega_d^i)t + j(\omega_0 + \omega_i)\frac{L_m}{c} + j(\omega_0 + \omega_i + \omega_d + \omega_d^i)\frac{L_m}{c} + j(\phi_0 + \phi_i)\right] + \exp\left[j(\omega_0 - \omega_i + \omega_d - \omega_d^i)t + j(\omega_0 - \omega_i)\frac{L_m}{c} + j(\omega_0 - \omega_i + \omega_d - \omega_d^i)\frac{L_m}{c} + j(\phi_0 - \phi_i)\right]\right) \quad (4)$$

The forward propagating and backscattered light have different phases due to change in the carrier and modulation frequencies. Since $\omega_0 >> \omega_i$, it is possible to assume $\omega_d + \omega_d^i \approx \omega_d - \omega_d^i \approx \omega_d$. Unless the laser linewidth is in the order of kHz or below and the target is moving at extreme velocities, this assumption is always true for most practical applications. The Doppler shift realized by individual modulation frequencies will be in the <kHz levels even for very fast targets, while the optical carrier will realize MHz level shifts. On the other hand, to further simplify Eqs. (3) and (4), it is assumed all carriers and sidetones are in phase, thus $\varphi_0 = \varphi_i = 0$. It is also possible to utilize the small variations in Doppler shift at different RF frequencies to determine the velocity information if it is resolvable.

After the beams in both arms propagate back to the PD from the reference mirror and the target, the corresponding electric fields will be converted into the detector photocurrent as $I_{PD} = R(E_m + E_{ref}) \cdot (E_m + E_{ref})^*$ to realize coherent detection, where R is the responsivity of the PD in A/W. The final $I_{PD}$ equation is given in FIG. 18, where $A_{ref}$ and $A_m$ stand for $$A_{ref} = \frac{A_0 \alpha_{ref}}{2\sqrt{2}} \text{ and } A_m = \frac{A_0 \alpha_m}{2\sqrt{2}},$$

respectively. Moreover, selecting tone frequencies in a manner that prevents frequency overlap between desired beating tones and weak cross beating tones would improve the crosstalk and spur-free dynamic range of the measurement. For simplicity, the weak intermodulation terms between individual tone frequencies are neglected in FIG. 18. The expected spectral peaks in the frequency domain are stationed at $\omega_d$, $\omega_i$, $2\omega_i$, $\omega_i + \omega_d$, $\omega_i - \omega_d$, $2\omega_i + \omega_d$ and $2\omega_i - \omega_d$, and at their negatives if a dual side-band modulation is used. The phases of $\omega_i$ and $2\omega_i$ terms are highly dependent on the reference field and have a very small contribution from the measurement arm for a highly unbalanced system. However, in amplitude based MTCW experiments, those tones were utilized for range measurements by comparing the relative amplitude variations (see FIG. 18).

FIG. 18 can be further simplified for tones at $\omega' = \omega_i \pm \omega_d$ or $\omega' = 2\omega_i \pm \omega_d$ as $$4\cos\left(\frac{\phi'}{2} - \frac{\phi''}{2}\right)\cos\left(\omega' t + \frac{\phi'}{2} + \frac{\phi''}{2}\right)$$

by using trigonometric identities. The definitions of $$\left(\frac{\phi'}{2} - \frac{\phi''}{2}\right) \text{ and } \left(\frac{\phi'}{2} + \frac{\phi''}{2}\right)$$

for each tone are given in FIG. 19. Hence, their amplitudes and phases reveal the range information as indicated in FIGS. 18-19. In particular, focus is placed on the phases of the measurable tones for the range information. Moreover, as shown in these definitions, for a system with N RF tones at the transmitter there are 4N frequency tones for data analysis for dynamic targets and there are 2N tones for static targets to extract the range information only, which is instrumental to increasing the robustness and accuracy of the system. An algorithm is shown for single-shot range and velocity measurements by utilizing the phases rather than the tone amplitudes. For illustration purposes, the present invention uses the phase accumulations of tones at $\omega_i + \omega_d$ and $\omega_i - \omega_d$ only.

One of the challenges in the proposed technique is the modulo $2\pi$ cyclic pattern of the phase accumulation. In other words, $\phi_{\omega_i \pm \omega_d}^{meas}$ represents the measured phase of the indicated frequency term, where $0 \leq \phi_{\omega_i \pm \omega_d}^{meas} \leq 2\pi$, and yields the same phase result for every $L_m$ such that $$L_m = L_0^{\omega_i \pm \omega_d} + \frac{2\pi c}{\omega_i \pm \omega_d} n_i,$$

where $n_i$ is an integer related with the $i^{th}$ frequency and $L_k^{\omega_i \pm \omega_d}$ is the measured length in the first cycle of the $i^{th}$ frequency when $n_i = 0$. Therefore, the present invention uses multiple tones to facilitate triangulation algorithms. In particular, the present invention defines the integer $$n_i = \left\lfloor \frac{L_m}{\lambda_{i-RF}} \right\rfloor,$$

where $\lambda_{i-RF}$ is the RF tone wavelength, then the present invention can define the possible measurement distance $L_m$ for a given phase measurement as in Eq. (5).

$$L_m = \frac{(2\pi n_i + \phi_{\omega_i \pm \omega_d}^{meas}) - \frac{\omega_i L_{ref}}{c}}{\frac{\omega_i \pm \omega_d}{c}} \quad (5)$$

Hence, for a given maximum measurable distance $L_{m-max}$ that is determined by the system parameters, such as laser power, laser linewidth, SNR of the system, etc., there are multiple solutions for the same target. While higher tone frequencies are desired for high resolution ranging, they are handicapped due to increasing $n_i$ value. Lower frequency tones produce a lower number of solutions with coarser resolutions, whereas the rapidly varying phases on the higher frequency tones generate multiple solutions with higher resolutions. The actual ranging solution is a triangulation of all tone frequencies. One method of converging to a single solution after triangulation is selecting the lowest frequency RF tone such that $\lambda_{1-RF} \geq L_{m-max}$. However, this will impose additional constraints on the detection electronics and the length of the time window that is utilized in the desired application. Similar to constraints in FMCW, if there is extensive scanning involved, using a longer time window will limit the number of scans that can be performed per second. Therefore, the number of RF tones and their frequency ranges should be determined based on the desired resolution and maximum ranging distance $L_{m-max}$. However, implementation of a pseudo pulsation or quasi-CW operation that uses long pulses with multi-tone RF modulations imposed on them can further enhance this approach by eliminating the limits of $n_i$ described above and provide a higher SNR solution due to high peak power excitation.

Similar to FMCW LIDARs, the frequency variations due to Doppler shift are used to identify the velocity information. The present invention utilizes up to 2N degrees of freedom to estimate the velocity information. The precision of the velocity measurement is determined by the time window used to capture the ranging. For instance, a 1 ms time window will yield a 1 kHz spectral resolution that corresponds to 1 mm/s or 1.5 mm/s resolutions in velocity measurements by using a 1 µm laser or by using a standard telecom laser at 1.55 µm, respectively. The variations in Doppler shifts at different RF tones are negligibly small in most applications. For practical purposes, using tones with higher powers would yield high SNR velocity measurements. The value of $\omega_d$ can be extracted from the photocurrent spectrum by comparing the $\omega_i$ or $2\omega_i$ tones and its corresponding Doppler-shifted $\omega_i \pm \omega_d$ or $2\omega_i \pm \omega_d$ tones, respectively, or by evaluating the Doppler peak near the baseband.

Using a fraction of the source laser before encoding the RF tones at the amplitude modulator and using proper algorithms in a new experimental setup can come up with a solution that removes the common noise terms and impact of coherence length limitations. In this technique, called Phase-Based Multi-Tone Continuous Wave LIDAR (PB-MTCW), instead of employing any form of frequency, phase, or amplitude sweeping, a CW laser is modulated with multiple phase-locked radio-frequency (RF) tones to generate stable sidebands using a Mach-Zehnder modulator (MZM) under a linear modulation configuration. Then the present invention utilizes the phases of individual tones that are encoded in the echo signal after heterodyning with the unmodulated local oscillator as demonstrated in FIG. 10A. Since the absolute value of the phase differences between the reference, i.e. local oscillator, and the echo signal are impaired due beyond the coherence length of the laser, the present invention utilizes the phase differences between RF tones that are free from common noise terms.

The phase difference of the individual sidebands reveals the target distance, while the acquired Doppler shift produces the target velocity, simultaneously. This present invention should be capable of single-shot ranging and velocimetry measurements at distances far beyond the coherence length of a laser. Experimentally measurements at distances more than 500× (limited by the experimental setup) the coherence length of the laser are demonstrated. Experimental results show that there is a negligible difference in measurements performed by a highly coherent laser and low coherence laser. Hence, the novel experimental system and signal processing algorithms presented here paves the way for LIDAR measurements beyond the existing capabilities of the current phase-based LIDAR technologies.

Assume that an amplitude-modulated CW laser source emits a light toward the target with an electric field profile of Eq. (6) as illustrated in FIG. 25A.

$$E_{out} = \frac{A_0}{\sqrt{2}} \alpha_f \sqrt{1-\beta} \bigg( \exp(j\omega_0 t + j\phi_0 + j\phi_n(t)) - \frac{m}{4} \sum_{i=1}^{N} (\exp[j(\omega_0 + \omega_i)t + j(\phi_0 + \phi_i^{RF}) + j\phi_n(t)] + \exp[j(\omega_0 - \omega_i)t + j(\phi_0 - \phi_i^{RF}) - j\phi_n(t)]) \bigg) \quad (6)$$

The $\omega_0$ and $\omega_i$ indicate the angular frequency of carrier and $i^{th}$ tone among a total of N tones, respectively, and $\phi_i^{RF}$ is the initial phase of the corresponding RF modulation, which is locked to a fixed value for all tones. $A_0$ is the field amplitude of light, m represents the modulation depth, $\beta$ is the coupling coefficient of the fiber coupler, $\alpha_f$ depicts the fiber loss. The reflected signal from a target that is $L_m$ meters away will be Doppler shifted if the target is nonstationary. The current generated at the photodetector after the interference of the echoed signal and the reference signal (unmodulated source laser) can be expressed as:

$$I_{pd} = R\beta A_0^2 \alpha_f^2 + \frac{R(1-\beta)A_0^2\alpha_m^2\alpha_f^2}{8} + \frac{Rm(1-\beta)A_0^2\alpha_m^2\alpha_f^2}{16} + \frac{Rm\sqrt{\beta}\sqrt{(1-\beta)}A_0^2\alpha_m\alpha_f^2}{\sqrt{2}}\cos\left(\omega_d t + \frac{2L_m}{c}\omega_0 + \frac{L_m}{c}\omega_d + \Phi(t,\tau)\right) - \frac{Rm(1-\beta)A_0^2\alpha_m^2\alpha_f^2}{8}\sum_{i=1}^{N}\cos\left(\omega_i t + \frac{2L_m}{c}\omega_i + \phi_i^{RF}\right) + \quad (7)$$

$$\frac{Rm(1-\beta)A_0^2\alpha_m^2\alpha_f^2}{16}\sum_{i=1}^{N}\cos\left(2\omega_i t + \frac{4L_m}{c}\omega_i\right) - \frac{Rm\sqrt{\beta}\sqrt{(1-\beta)}A_0^2\alpha_m\alpha_f^2}{2\sqrt{2}}\sum_{i=1}^{N}\cos((\omega_i+\omega_d)t + \frac{2L_m}{c}(\omega_o+\omega_i) + \frac{L_m}{c}\omega_d + \phi_i^{RF} + \Phi(t,\tau)) - \frac{Rm\sqrt{\beta}\sqrt{(1-\beta)}A_0^2\alpha_m\alpha_f^2}{2\sqrt{2}}\sum_{i=1}^{N}\cos((\omega_i-\omega_d)t - \frac{2L_m}{c}(\omega_o-\omega_i) - \frac{L_m}{c}\omega_d - \phi_i^{RF} - \Phi(t,\tau))$$

The optical carrier will experience a Doppler frequency shift $(\omega_d)$ that is proportional to the velocity of the target (v) by $\omega_d=(2v/c)\omega_0$ as indicated in FIGS. 25B-25C. Here, R is the responsivity of the detector and $\alpha_m$ represents the scattering loss. The phase noise of the CW laser before and after a travel time T=$2L_m$/c are $\varphi_n(t)$ and $\varphi_n(t-\tau)$. Therefore the phase difference due to laser phase noise can be represented as $\Phi(t,\tau)=\phi_n(t)-\phi_n(k(t-\tau))$. If the target is static, the resultant $I_{pd}$ equation will be:

$$I_{pd} = RA_0^2\alpha_f^2\beta + \frac{3RA_0^2\alpha_m^2\alpha_f^2(1-\beta)}{16} + \frac{RA_0^2\alpha_m\alpha_f^2\sqrt{\beta}\sqrt{1-\beta}}{\sqrt{2}}\cos\left(\omega_0\frac{2L_m}{c} + \Phi(t,\tau)\right) - \frac{RmA_0^2\alpha_m\alpha_f^2\sqrt{\beta}\sqrt{1-\beta}}{2\sqrt{2}}\left[\sum_{i=1}^{N}\cos\left(\omega_i t + (\omega_0+\omega_i)\frac{2L_m}{c} + \phi_i^{RF} + \Phi(t,\tau)\right) + \sum_{i=1}^{N}\cos\left(\omega_i t - (\omega_0-\omega_i)\frac{2L_m}{c} - \phi_i^{RF} - \Phi(t,\tau)\right)\right] + \frac{RmA_0^2\alpha_m^2\alpha_f^2(1-\beta)}{8}\left[\sum_{i=1}^{N}\cos\left(\omega_i t + \omega_i\frac{2L_m}{c} + \phi_i^{RF}\right) + \sum_{i=1}^{N}\cos\left(\omega_i t + \omega_i\frac{2L_m}{c} - \phi_i^{RF}\right)\right] + \frac{Rm^2A_0^2\alpha_m^2\alpha_f^2(1-\beta)}{8}\sum_{i=1}^{N}\cos\left(2\omega_i t + \omega_i\frac{4L_m}{c}\right) \quad (8)$$

The present invention features an algorithm that can calculate the phase and frequency information independent of common noise terms, and then extract the velocity and range of the target. In the case of dynamic targets, $$A_i\cos\left((\omega_i\pm\omega_d)t\pm\frac{2L_m}{c}\left(\omega_0\pm\frac{L_m}{c}\omega_d\pm\phi_i^{RF}\pm\Phi(t,\tau)\right)\right)$$

can be used to define a single tone. As is clearly seen from this definition, a frequency shift in the carrier frequency or any tone frequencies reveals the Doppler shift, and hence the velocity of the target. However, range information is stored in the phase term and it is mixed with noise terms. To eliminate the common noise terms the present invention mixes two of these individual tones at $\omega_i$ and $\omega_j$(i≠j), either electronically or in the digital domain, the resultant intermediate frequency (IF) tone will be $A_iA_j\cos(\Delta\omega_{i,j}t\pm\Delta\phi_{i,j})$, where $\Delta\phi_{i,j}$ and $\Delta\omega_{i,j}$ are the phase and frequency differences of $i^{th}$ and $j^{th}$ tones, respectively. As a result, the common phase and frequency terms related to the optical carrier and the Doppler shift are eliminated with inter-tonal mixing that also eliminates the impact of the coherence length of the laser. Similarly, the present invention employs RF mixing of carrier frequencies of a static target with individual tones defined as $$2A_i \cos\left(\frac{2L_m}{c}\omega_0 + \phi_i^{RF} + \Phi(t,\tau)\right)\cos\left(\omega_i t + \frac{2L_m}{c}\omega_i\right),$$

to eliminate common noise terms. After the RF mixing, the phase of IF tones will be free from phase and the amplitude noise of the source and reveal only the range information of the target: $L_m = (2\pi n + \Delta\phi_{i,j})c/\Delta\omega_{i,j}$, where n is an integer. As a result, PB-MTCW LIDAR methodology is immune to the phase variations induced by the laser phase noise, and hence it is possible to perform ranging beyond the coherence length of the laser.

The modulo-$2\pi$ cyclic behavior of phase will lead to a periodic range estimation. Similar to global positioning systems that use multiple satellites to triangulate the exact position, the present invention implements redundancy of multiple agents for accurate range information. Here, multiple RF tones are used to pinpoint the value of $L_m$ by using a triangulation algorithm. In particular, for a given $\Delta\phi_{i,j}$, which corresponds to $\Delta\omega_{i,j}$ the total length will be $L_m = nL^{i,j} + L_0^{i,j}$ where the spatial period is $L^{i,j} = 2\pi c/\Delta\omega_{i,j}$ and the residual length is $L_0^{i,j} = c\Delta\phi_{i,j}/\Delta\omega_{i,j}$. If the integer value of n is swept, the potential $L_m$ values can be computed for each $\Delta\omega_{i,j}$. After concatenating all the possible combinations of $L_m$ into a data matrix $M_{k,l}$, where k is equal to the predefined sweep limit ($n_m$) that is set according to the maximum expected range, and l is the number of available $\Delta\omega_{i,j}$ combinations. The standard deviation of each row is calculated as $$\sigma_k = \sqrt{\sum_{r=1}^{l}(M_{k,r} - \overline{M_k})^2/l},$$

where $\overline{M_k}$, the mean of the $k^{th}$ row, which yields the minimum $\sigma_k$ corresponds to the actual target distance $L_m$ as depicted in FIG. 10C. However, the minimum a repeats itself at every $L_{ref} = 2\pi c/\omega_{gcd}$, where $\omega_{gcd}$ stands for the greatest common divisor of the $\Delta\omega_{i,j}$, such phenomenon is called an unambiguity length in LIDAR systems. One way of avoiding recursive solution or unambiguity length is the selection of the tones in a fashion to make sure $L_{rep}$ is longer than the maximum expected range. For extremely long measurement lengths, instead of using very low-frequency modulation tones to increase $L_{rep}$, an introduction of a quasi-CW pulsation will be more advantageous. Not only that such a quasi-CW approach facilitates time gating to generate coarse range information without unambiguity length limitation, but also results in higher signal-to-noise ratio measurements compared to an equal power pure CW approach.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. In particular, the presented algorithms and configurations are compatible with photonic integrated circuits, and hence plurality of active or passive components including electronic circuitry can be integrated on the same platform through planar fabrication techniques and hybrid integration techniques. For instance, many components can be integrated on a silicon photonics platform, or on compound semiconductor platforms similar to InP, or on electro-optic materials similar to $LiNbO_3$. Thus, the apparatuses described in the present invention may be contained on a single chip. All such modifications and variations are intended to be included herein within the scope of this disclosure.

The present invention features an apparatus (103). In some embodiments, the apparatus (103) may comprise a signal emitter, a signal receiver (218), and at least one computing device. The computing device may comprise at least one processor and a data store may comprise executable instructions. The instructions, when executed by the at least one processor, may cause the apparatus (103) to at least generate an initial signal based at least in part on a sum of a plurality of initial radio frequency (RF) tones such that the signal emitter emits the initial signal as a multi-tone continuous wave signal, identify a reflected signal, the reflected signal being a version of the initial signal reflected from a target such that the signal receiver (218) receives the reflected signal, determine a plurality of resultant RF tones based at least in part on the reflected signal, such that a respective one of the plurality of resultant RF tones may comprise a frequency, a power, and a phase, locate, if a cross-beating of the initial signal and the reflected signal is detected a plurality of frequency spikes at a Doppler frequency near a baseband of the initial signal, measure a Doppler shift based on the plurality of frequency spikes to a yield a velocity of the target, and triangulate, by the plurality of phases of the plurality of resultant RF tones, a distance to the target.

In some embodiments, the apparatus (103) may further comprise a beam splitter (121) for splitting the amplitude modulated laser beam (907) into an emitted component and a reference component. Triangulating the distance to the target may comprise calculating, for each tone of the plurality of resultant RF tones, a plurality of possible distances to the target based on a plurality of oscillating frequencies based on the frequency generated by the Doppler shift, the phase, and an integer constant, generating a data matrix of data from calculating the plurality of possible distances such that each column of the data matrix corresponds to an oscillating frequency of the plurality of oscillation frequencies and such that each row of the data matrix corresponds to the integer constant, calculating, for each row of the data matrix, a standard deviation, resulting in a plurality of standard deviations, identifying a smallest standard deviation from the plurality of standard deviations, and calculating, based on the integer constant of the row with the smallest standard deviation, the distance to the target. In some embodiments, calculating the plurality of possible distances may comprise calculating $$L_m = \frac{(2\pi n_i + \phi_{\omega_i \pm \omega_d}^{meas}) - \frac{\omega_i L_{ref}}{c}}{\frac{\omega_i \pm \omega_d}{c}}$$

for a plurality of integer constants $n_i$. $L_m$ may represent a possible distance, $L_{ref}$ may represent a distance from the reference component, $\omega_i$ may represent the frequency, $\omega_d$ may represent the Doppler shift, $\phi_{\omega_i \pm \omega_d}^{meas}$ may represent the phase, and c may represent the speed of light. In some embodiments, the instructions of the data store may further comprise fitting a frequency-domain sinusoidal wave to the plurality of resultant RF tones in a frequency domain, and determining the distance to the target based at least in part on a modulation of the frequency-domain sinusoidal wave.

The present invention features an apparatus (103). In some embodiments, the apparatus (103) may comprise a signal emitter, a signal receiver (218), a modulator, a beam splitter (121), and at least one computing device. The computing device may comprise at least one processor and a data store which may comprise executable instructions. The instructions, when executed by the at least one processor, may cause the apparatus (103) to at least generate an initial signal such that the initial signal may be split by the beam splitter (121) into a reference arm and a measurement arm. The instructions, when executed by the at least one processor, may further cause the apparatus (103) to at least modulate, by the modulator, the measurement arm based on a plurality of initial radio frequency (RF) tones. The measurement arm may become a multi-tone continuous wave signal and the plurality of initial RF tones have a fixed phase relationship. The instructions, when executed by the at least one processor, may further cause the apparatus (103) to at least identify a reflected signal, the reflected signal being a version of the measurement arm reflected from a target, such that the signal receiver (218) receives the reflected signal and the reference arm. The instructions, when executed by the at least one processor, may further cause the apparatus (103) to at least interpolate the reflected signal and the reference arm, determine a plurality of resultant RF tones based at least in part on the reflected signal, a respective one of the plurality of resultant RF tones may comprise a frequency and a phase. The instructions, when executed by the at least one processor, may further cause the apparatus (103) to at least locate if a cross-beating of the initial signal and the reflected signal is detected a plurality of frequency spikes at a Doppler frequency near a baseband of the initial signal, measure a Doppler shift based on the plurality of frequency spikes to yield a velocity of the target, calculate a 0-phase cosine comparison of RF tones from the plurality of resultant RF tones to generate a plurality of relative phase differences, and calculate, by the plurality of relative phase differences, a distance to the target. The apparatus (103) may be capable of operating outside of a coherence length of the signal emitter.

In some embodiments, the apparatus may further comprise a collimator (118) for aligning the measurement arm as it may be directed towards the target. In some embodiments, calculating the 0-phase cosine comparison may further comprise generating a plurality of relative frequency differences, each relative frequency difference corresponding to a relative phase difference. Calculating the distance to the target may comprise calculating, based on each relative phase difference of the plurality of relative phase differences, each relative frequency difference corresponding to the relative phase difference, and an integer constant, a possible distance to the target, resulting in a plurality of possible distances, generating a data matrix of data from calculating the plurality of possible distances such that each column of the data matrix corresponds to a relative phase difference and such that each row of the data matrix corresponds to the integer constant, calculating, for each row of the data matrix, a standard deviation, resulting in a plurality of standard deviations, identifying a smallest standard deviation from the plurality of standard deviations, and calculating, based on the integer constant of the row with the smallest standard deviation, the distance to the target. Calculating the plurality of possible distances may comprise calculating $$L_m = \frac{(2\pi n + \Delta\phi_{i,j})c}{2\Delta\omega_{i,j}}$$

for a plurality of integer constants n. $L_m$ may represent the possible distance, $\Delta\phi_{i,j}$ may represent the relative phase difference, $\Delta\omega_{i,j}$ may represent the relative frequency difference, and c may represent the speed of light.

In some embodiments, the data store may further comprise instructions for calculating a 0-phase cosine comparison of Doppler shifted RF tones from the plurality of resultant RF tones to generate a plurality of relative phase differences. In some embodiments, the modulator may comprise a Mach-Zehnder modulator (109) such that the Mach-Zehnder modulator (109) modulates the measurement arm into an amplitude modulated laser beam (907) based at least in part on inputs to the Mach-Zehnder modulator (109) may comprise: a laser beam (907), and the plurality of initial RF tones. In some embodiments, the signal emitter may comprise a laser source (106). In other embodiments, the signal emitter may comprise a RADAR source. In this case, the initial signal may comprise a carrier frequency and the modulator may modulate the measurement arm with a plurality of phase-locked modulation frequencies for the purpose of RADAR ranging and velocimetry. In other embodiments, the initial signal may comprise a carrier frequency modulated by a plurality of phase-locked modulation frequencies such that the measurement arm skips the modulator for the purpose of RADAR ranging and velocimetry. In other embodiments still, the signal emitter may comprise a transmission antenna and the signal receiver (218) may comprise a receiver antenna having a frequency difference from the transmission antenna within a bandwidth of the receiver antenna for the purpose of GPS and navigation.

Referring now to FIG. 27, the present invention features an apparatus (1000). In some embodiments, the apparatus (1000) may comprise a transmitter (1002) capable of producing a plurality of RF tones (1001). The plurality of RF tones (1001) may comprise a sum of multiple single sideband modulation or double sideband modulation. The apparatus (1000) may further comprise a transmit antenna or transmit optics (1003) operatively coupled to the transmitter (1002) capable of generating a transmitted signal (1004) based on the plurality of RF tones (1001) to a target (1005). The apparatus (1000) may further comprise a receiver antenna or receiver optics (1007) capable of receiving a reflected signal (1006) from the target (1005) based on the transmitted signal (1004). The apparatus (1000) may further comprise a local oscillator (1008) capable of generating a reference signal (1009). The apparatus (1000) may further comprise a beam combiner (1010) capable of receiving the reflected signal (1006) from the receiver antenna (1007) and the reference signal (1009) from the local oscillator (1008) to generate a superposition signal (1011). The apparatus (1000) may further comprise a photodetector (1012) capable of receiving the superposition signal (1011) to be converted into an electrical current. The apparatus (1000) may further comprise an electronic processing component (1013) comprising a processor capable of executing computer-readable instructions and a memory component comprising a plurality of computer-readable instructions comprising accepting the electrical current from the photodetector (1012), processing the electrical current, and providing a plurality of frequency, phase and amplitude data of the plurality of RF tones (1001) measured from the electrical current.

The plurality of RF tones (1001) may comprise a sum of multiple RF frequency tones such that the plurality of RF tones (1001) may be non-harmonic, harmonic of a common RF reference signal, subharmonic of a common RF signal, phase-locked, or a combination thereof. The plurality of RF tones (1001) may comprise a sum of multiple RF subcarrier modulation signals. The plurality of RF tones (1001) may comprise a broadband RF signal with distinguishable frequency characteristics that may be suitable for phase, frequency, and amplitude measurement at a selected part of the spectrum of the apparatus (1000).

The transmitter (1002) may comprise an electromagnetic signal generator selected from a group comprising a light source, a laser, an RF generator, a TeraHertz (THz) generator, or a source operating at any frequency of the electromagnetic spectrum. The transmitter (1002) may comprise a source and an external modulator capable of encoding RF tones (1001) and generating a multi-tone continuous wave (CW) signal. The transmitter (1002) may comprise a source having a direct modulation capability to encode RF tones (1001) and generating a multi-tone continuous wave (CW) signal. The transmitter (1002) may be capable of generating a multi-tone continuous wave signal or a quasi-continuous wave signal with multi-tone RF modulation for ranging, velocimetry, global positioning, and navigation. The transmitter (1002) may be capable of generating, by a linear or non-linear optical processor that can generate a plurality of desired sidebands. The transmitter (1002) may be capable of generating a multi-tone continuous wave or a quasi-continuous wave RF or a TeraHertz signal after mixing the plurality of RF tones (1001) with a carrier frequency. The transmitter (1002) may be capable of generating a multi-tone continuous wave or a quasi-continuous wave RF or a TeraHertz signal by adding the plurality of RF tones (1001).

The transmit antenna (1003) may shape an output of the transmitter (1002) to deliver enough power to echo back from the target (1005). The transmit antenna (1003) may comprise a beam collimator, a beam focusing element, or a diverging element. The receiver antenna (1007) and the transmit antenna (1003) may comprise a single communication component. The local oscillator (1008) may comprise a fraction of the transmitter (1002) with encoded RF modulation. The local oscillator (1008) may comprise a fraction of the transmitter (1002) without encoded RF modulation. The local oscillator (1008) may comprise a frequency shifted transmitter with encoded RF modulation to compensate for at least a portion of a Doppler shift of the reflected signal.

A frequency difference between the transmitter (1002) and the local oscillator (1008) may be fixed. A frequency difference between the transmitter (1002) and the local oscillator (1008) may be within a bandwidth of the photodetector (1012). The beam combiner (1010) may comprise a free space-based beam splitter cube, a fiber-based coupler, a photonic integrated circuit, a RF mixer, a Terahertz mixer, or a combination thereof. The electronic processing unit (1013) may further comprise a data acquisition system, an analog filter, a digital filter, a RF spectrum analyzer, a frequency counter, a phase detector, and an amplitude detector.

The present invention features a ranging and velocimetry apparatus (1000). The apparatus may comprise a transmitter (1002) capable of generating a multi-tone signal comprising a continuous wave (CW) signal or a quasi-CW signal, a local oscillator (1008) capable of using at least a portion of the multi-tone signal from the transmitter (1002) as a reference signal, and an electronic processing unit (1013) comprising a processor capable of executing computer-readable instructions and a memory component comprising a plurality of computer-readable instructions. The plurality of computer-readable instructions may comprise accepting the multi-tone signal and the reference signal, generating a superposition (1011) of the multi-tone signal and the reference signal, generating, by the superposition signal (1011), a plurality of amplitude variations due to differences in phase accumulations, fitting, by the plurality of amplitude variations, the superposition signal (1011) to a sine wave, determining, by the sine fitting, a range to a target (1005), identifying a Doppler shift of the superposition signal (1011), estimating, by the Doppler shift, a velocity of the target (1005), and estimating, by the Doppler shift, a direction of movement of the target (1005).

The apparatus (1000) may further comprise a frequency shifter capable of generating the reference signal to compensate for at least a portion of the Doppler shift. The reference signal may comprise a fixed frequency and a fixed phase difference from the transmitter (1002) to compensate for at least a portion of the Doppler shift. The transmitter (1002) may comprise a plurality of transmitters capable of generating red, green, and blue wavelengths. The memory component may further comprise instructions for determining, by the sine fitting and RGB coding, a color of the target (1005).

The present invention features a light detection and ranging (LIDAR) and velocimetry apparatus (1000). The apparatus (1000) may comprise a transmitter (1002) capable of generating a multi-tone signal comprising a continuous wave (CW) signal or a quasi-CW signal, a local oscillator (1008) capable of using at least a portion of the multi-tone signal from the transmitter (1002) as a reference signal, and an electronic processing unit (1013) comprising a processor capable of executing computer-readable instructions and a memory component comprising a plurality of computer-readable instructions. The plurality of computer-readable instructions may comprise accepting the multi-tone signal and the reference signal, generating a superposition (1011) of the multi-tone signal and the reference signal, wherein generating the superposition (1011) generates beating tones, determining, by a plurality of phases of the beating tones, a broad range to a target (1005), identifying a Doppler shift of the superposition signal (1011), estimating, by the Doppler shift and the plurality of beating tones, a velocity of the target (1005), and determining, based on the plurality of beating tones and the broad range to the target (1005), a precise range to the target (1005).

Determining the precise range to the target (1005) may comprise a triangulation algorithm utilizing phases and/or amplitude of the plurality of beating tones. Determining the precise range may further comprise using time-of-arrival information of pulses of the multi-tone signal. The apparatus (1000) may further comprise a frequency shifter capable of generating the reference signal to compensate for at least a portion of the Doppler shift. The reference signal may comprise a fixed frequency and a fixed phase difference from the transmitter (1002) to compensate for at least a portion of the Doppler shift. The reference signal may comprise an independent unmodulated CW or quasi-CW signal. The reference signal may comprise an independent unmodulated free-running CW or quasi-CW signal. The memory component may further comprise instructions for mixing, by an analog or digital mixer, a selected set of the plurality of beating tones to cancel common noise terms and perform ranging of the target (1005) beyond a coherence length of the transmitter (1002).

The present invention features a RADAR ranging and velocimetry apparatus (1000). The apparatus (1000) may comprise a transmitter (1002) capable of generating a multi-tone signal comprising a continuous wave (CW) signal, a quasi-CW signal, or a TeraHertz signal, a local oscillator (1008) capable of using at least a portion of the multi-tone signal from the transmitter (1002) as a reference signal, and an electronic processing unit (1013) comprising a processor capable of executing computer-readable instructions and a memory component comprising a plurality of computer-readable instructions. The plurality of computer-readable instructions may comprise accepting the multi-tone signal and the reference signal, generating a superposition (1011) of the multi-tone signal and the reference signal, wherein generating the superposition (1011) generates beating tones, determining, by a plurality of phases of the beating tones, a broad range to a target (1005), identifying a Doppler shift of the superposition signal (1011), estimating, by the Doppler shift and the plurality of beating tones, a velocity of the target (1005), and determining, based on the plurality of beating tones and the broad range to the target (1005), a precise range to the target (1005).

Determining the precise range to the target (1005) may further comprise a triangulation algorithm utilizing phases and/or amplitude of the plurality of beating tones. Determining the precise range may further comprise using time-of-arrival information of pulses of the multi-tone signal. Determining the precise range may further comprise a triangulation algorithm utilizing phases of the plurality of beating tones. The triangulation algorithm may further utilize relative changes in phases of the plurality of beating tones. The apparatus (1000) may further comprise a frequency shifter capable of generating the reference signal to compensate for at least a portion of the Doppler shift. The reference signal may comprise a fixed frequency and a fixed phase difference from the transmitter (1002) to compensate for at least a portion of the Doppler shift. The reference signal may comprise an independent unmodulated CW or quasi-CW signal. The reference signal may comprise an independent unmodulated free-running CW or quasi-CW signal.

The present invention features a RADAR-based global position and navigation apparatus (1000). The apparatus may comprise a remote transmitter (1002) capable of generating a multi-tone signal comprising a continuous wave (CW) signal, a quasi-CW signal, or a TeraHertz signal, a local receiver (1007) comprising a local oscillator (1008) capable of generating an independent unmodulated CW or quasi-CW signal as a reference signal, a photodetector (1012) capable of receiving the multi-tone signal and the reference signal and generating an electrical signal, wherein a frequency difference between the local oscillator (1008) and the remote transmitter (1002) may be set to be within a bandwidth of the photodetector (1012), and an electronic processing unit (1013) comprising a processor capable of executing computer-readable instructions and a memory component comprising a plurality of computer-readable instructions. The plurality of computer-readable instructions may comprise accepting the electrical signal from the photodetector (1012), generating a superposition (1011) of the multi-tone signal and the reference signal, wherein generating the superposition (1011) generates beating tones, determining, by a plurality of phases of the beating tones, a broad range to a target (1005), identifying a Doppler shift of the superposition signal (1011), estimating, by the Doppler shift and the plurality of beating tones, a velocity of the target (1005), and determining, based on the plurality of beating tones and the broad range to the target (1005), a precise range to the target (1005).

Determining the precise range to the target (1005) may comprise a triangulation algorithm utilizing phases and/or amplitude of the plurality of beating tones. Determining the precise range may further comprise using time-of-arrival information of pulses of the multi-tone signal. Determining the precise range may further comprise a triangulation algorithm utilizing phases of the plurality of beating tones. The triangulation algorithm may further utilize relative changes in phases of the plurality of beating tones. The memory component may further comprise instructions for mixing, by an analog or digital mixer, a selected set of the plurality of beating tones to cancel common noise terms and perform ranging of the target (1005) beyond a coherence length of the transmitter (1002).

The present invention may be directed to a range detection and velocimetry apparatus (1000). In some embodiments, the apparatus (1000) may comprise a transmitter (1002) capable of producing a plurality of RF tones (1001). The plurality of RF tones (1001) may comprise a sum of multiple single sideband modulation or double sideband modulation. The apparatus (1000) may further comprise a transmit antenna or optics (1003) operatively coupled to the transmitter (1002) capable of generating a transmitted signal (1004) modulated with the plurality of RF tones (1001) to a target (1005). The apparatus (1000) may further comprise a receiver antenna or optics (1007) capable of receiving a reflected signal (1006) from the target (1005) based on the transmitted signal (1004). The apparatus (1000) may further comprise a local oscillator (1008) capable of generating a reference signal (1009). The apparatus (1000) may further comprise a beam combiner (1010) capable of receiving the reflected signal (1006) from the receiver antenna (1007) and the reference signal (1009) from the local oscillator (1008) to generate a superposition signal (1011). The apparatus (1000) may further comprise a photodetector (1012) capable of receiving the superposition signal (1011) to be converted into an electrical current.

The apparatus (1000) may further comprise an electronic processing unit (1013). The electronic processing unit (1013) may comprise a processor capable of executing computer-readable instructions and a memory component. The memory component may comprise a plurality of computer-readable instructions comprising accepting the multi-tone signal and the reference signal and generating a superposition (1011) of the multi-tone signal and the reference signal. Generating the superposition (1011) may generate beating tones. The plurality of computer-readable instructions may further comprise determining, by a plurality of phases of the beating tones or relative amplitude variations of tones, a broad range to a target (1005), identifying a Doppler shift of the superposition signal (1011), estimating, by the Doppler shift and the plurality of beating tones, a velocity of the target (1005), and determining, based on the phase, frequency and amplitude of plurality of beating tones and the broad range to the target (1005), a precise range to the target (1005).

In some embodiments, the plurality of RF tones (1001) may comprise a sum of multiple RF frequency tones such that the plurality of RF tones (1001) may be non-harmonic, harmonic of a common RF reference signal, subharmonic of a common RF signal, phase-locked, or a combination thereof. In some embodiments, the plurality of RF tones (1001) may comprise a broadband RF signal such as sub-carrier modulation signals with distinguishable frequency characteristics that may be suitable for phase, frequency, and amplitude measurement at a selected part of the spectrum of the apparatus (1000). In some embodiments, the transmitter (1002) may comprise a CW or quasi CW electromagnetic signal generator selected from a group comprising laser, an RF generator, a TeraHertz (THz) generator, or a source operating at any frequency of the electromagnetic spectrum with direct modulation or external modulation capability to encode the plurality of RF tones (1001). In some embodiments, the local oscillator (1008) may comprise a fraction of the transmitter (1002) before or after RF modulation.

In some embodiments, the apparatus (1000) may further comprise a frequency shifter capable of generating the reference signal to compensate for at least a portion of the Doppler shift. In some embodiments, the reference signal may comprise a fixed frequency and a fixed phase difference from the transmitter (1002) to compensate for at least a portion of the Doppler shift. In some embodiments, the reference signal may comprise an independent unmodulated CW or quasi-CW signal. In some embodiments, the electronic processing unit (1013) may further comprise a data acquisition system, an analog filter, a digital filter, a RF spectrum analyzer, a frequency counter, a phase detector, and an amplitude detector.

In some embodiments, determining the precise range to the target (1005) may comprise a triangulation algorithm utilizing phases of the plurality of beating tones and relative phase differences between plurality of beating tones. Determining the precise range further may comprise using time-of-arrival information of pulses of the multi-tone signal. Determining the precise range may further comprise generating, by the superposition signal (1011), a plurality of amplitude variations due to differences in phase accumulations and then fitting, by the plurality of amplitude variations, the superposition signal (1011) to a sine wave. In some embodiments, the memory component further may comprise instructions for mixing, by an analog or digital mixer, a selected set of the plurality of beating tones to cancel common noise terms and perform ranging of the target (1005) beyond a coherence length of the transmitter (1002).

The present invention features a RADAR ranging and velocimetry apparatus (1000). The apparatus (1000) may comprise a transmitter (1002) capable of generating a multi-tone signal may comprise a continuous wave (CW) signal, a quasi-CW signal, or a TeraHertz signal. The apparatus (1000) may further comprise a local oscillator (1008) capable of using at least a portion of the multi-tone signal from the transmitter (1002) as a reference signal.

The apparatus (1000) may further comprise an electronic processing unit (1013). The electronic processing unit (1013) may comprise a processor capable of executing computer-readable instructions and a memory component. The memory component may comprise a plurality of computer-readable instructions for accepting the multi-tone signal and the reference signal and generating a superposition (1011) of the multi-tone signal and the reference signal. Generating the superposition (1011) may generate beating tones. The computer-readable instructions may further comprise determining, by a plurality of phases of the beating tones, a broad range to a target (1005), identifying a Doppler shift of the superposition signal (1011), estimating, by the Doppler shift and the plurality of beating tones, a velocity of the target (1005), and determining, based on the plurality of beating tones and the broad range to the target (1005), a precise range to the target (1005).

In some embodiments, determining the precise range to the target (1005) may comprise a triangulation algorithm utilizing phases of the plurality of beating tones and utilizing relative changes in phases of the plurality of beating tones. Determining the precise range may further comprise using time-of-arrival information of pulses of the multi-tone signal. In some embodiments, the reference signal may comprise an unmodulated CW or quasi-CW signal.

The present invention features a global position and navigation apparatus (1000). The apparatus (1000) may comprise a remote transmitter (1002) capable of generating a multi-tone signal may comprise a continuous wave (CW) signal, a quasi-CW signal, or a TeraHertz signal. The apparatus (1000) may further comprise a local receiver (1007) may comprise a local oscillator (1008) capable of generating an independent unmodulated CW or quasi-CW signal as a reference signal. The apparatus (1000) may further comprise a photodetector (1012) capable of receiving the multi-tone signal and the reference signal and generating an electrical signal. A frequency difference between the local oscillator (1008) and the remote transmitter (1002) may be set to be within a bandwidth of the photodetector (1012).

The apparatus (1000) may further comprise an electronic processing unit (1013). The electronic processing unit (1013) may comprise a processor capable of executing computer-readable instructions and a memory component. The memory component may comprise a plurality of computer-readable instructions for accepting the electrical signal from the photodetector (1012) and generating a superposition (1011) of the multi-tone signal and the reference signal. Generating the superposition (1011) may generate beating tones. The computer-readable instructions may further comprise determining, by a plurality of phases of the beating tones, a broad range to a target (1005), identifying a Doppler shift of the superposition signal (1011), estimating, by the Doppler shift and the plurality of beating tones, a velocity of the target (1005), determining, based on the plurality of beating tones and the broad range to the target (1005), a precise range to the target (1005), and mixing, by an analog or digital mixer, a selected set of the plurality of beating tones to cancel common noise terms and perform ranging of the target (1005) beyond a coherence length of the transmitter (1002).

In some embodiments, determining the precise range to the target (1005) may comprise a triangulation algorithm utilizing phases of the plurality of beating tones and utilizing the relative phase changes between tones. Determining the precise range may further comprise using time-of-arrival information of quasi CW pulses of the multi-tone signal.

As used herein, the terms "approximate" and "approximately" can refer to values that differ about 30% more or less, about 25% more or less, about 20% more or less, about 15% more or less, about 10% more or less, or about 5% more or less than the approximate value noted.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

EMBODIMENTS

The following embodiments are intended to be illustrative only and not to be limiting in any way.

Embodiment 1: An apparatus (103), comprising: a signal emitter; a signal receiver (218); and at least one computing device comprising at least one processor and a data store comprising executable instructions, wherein the instructions, when executed by the at least one processor, cause the apparatus (103) to at least: generate an initial signal based at least in part on a sum of a plurality of initial radio frequency (RF) tones, wherein the signal emitter emits the initial signal as a multi-tone continuous wave signal; identify a reflected signal, the reflected signal being a version of the initial signal reflected from a target, wherein the signal receiver (218) receives the reflected signal; determine a plurality of resultant RF tones based at least in part on the reflected signal, a respective one of the plurality of resultant RF tones comprising a frequency and a power; locate, if a cross-beating of the initial signal and the reflected signal is detected, a plurality of frequency spikes at a Doppler frequency near a baseband of the initial signal or near the tone frequencies; measure a Doppler shift based on the plurality of frequency spikes to a yield a velocity of the target; fit a frequency-domain sinusoidal wave to the amplitude variations of the plurality of resultant RF tones in a frequency domain; and determine a distance to the target based at least in part on sinusoidal amplitude variations on signal in a frequency-domain.

Embodiment 2: The apparatus (103) of embodiment 1, wherein the signal emitter comprises: a laser source (106); a Mach-Zehnder modulator (109); a beam splitter (121); and wherein the Mach-Zehnder modulator (109) outputs the initial signal as an amplitude modulated laser beam (907) based at least in part on inputs to the Mach-Zehnder modulator (109) comprising: a laser beam (907), and the plurality of initial RF tones; wherein the laser source has a direct modulation capability where the amplitude modulated laser beam (907) is generated internally in the laser.

Embodiment 3: The apparatus (103) of embodiment 2, wherein the signal emitter further comprises a linear or nonlinear signal processing unit that can generate desired sidebands corresponding to a desired plurality of RF sidebands.

Embodiment 4: The apparatus (103) of embodiment 2, wherein the beam splitter (121) splits the amplitude modulated laser beam (907) into an emitted component and a reference component, wherein the reference component is recombined with the reflected signal to generate an interference pattern of the plurality of resultant RF tones and carrier frequencies.

Embodiment 5: The apparatus (103) of embodiment 1, further comprising: a summing amplifier (112) that outputs the sum of the plurality of initial RF tones to generate the initial signal; and wherein the signal emitter comprises an antenna (212) that emits the initial signal as electromagnetic waves at any frequency.

Embodiment 6: The apparatus (103) of embodiment 5, wherein the signal emitter further comprises a power splitter (209) that splits the initial signal into an emitted component and a reference components, wherein another summing amplifier (224) sums the reference component with the reflected signal to generate an interference pattern from the plurality of resultant RF tones; wherein the instructions, when executed by the at least one processor, further cause the apparatus (103) to at least: determine a distance to the target based at least in part on sinusoidal amplitude variations on interference signal in a frequency-domain.

Embodiment 7: An apparatus (103), comprising: a signal emitter; a signal receiver (218); and at least one computing device comprising at least one processor and a data store comprising executable instructions, wherein the instructions, when executed by the at least one processor, cause the apparatus (103) to at least: generate an initial signal based at least in part on a sum of a plurality of initial radio frequency (RF) tones, wherein the signal emitter emits the initial signal as a multi-tone continuous wave signal; identify a reflected signal, the reflected signal being a version of the initial signal reflected from a target, wherein the signal receiver (218) receives the reflected signal; determine a plurality of resultant RF tones based at least in part on the reflected signal, a respective one of the plurality of resultant RF tones comprising a frequency, a power, and a phase; locate, if a cross-beating of the initial signal and the reflected signal is detected a plurality of frequency spikes at a Doppler frequency near a baseband of the initial signal; measure a Doppler shift based on the plurality of frequency spikes to a yield a velocity of the target; and triangulate, by the plurality of phases of the plurality of resultant RF tones, a distance to the target.

Embodiment 8: The apparatus (103) of embodiment 7 further comprising a beam splitter (121) for splitting the amplitude modulated laser beam (907) into an emitted component and a reference component.

Embodiment 9: The apparatus (103) of embodiment 7, wherein triangulating the distance to the target comprises: calculating, for each tone of the plurality of resultant RF tones, a plurality of possible distances to the target based on a plurality of oscillating frequencies based on the frequency generated by the Doppler shift, the phase, and an integer constant; generating a data matrix of data from calculating the plurality of possible distances, wherein each column of the data matrix corresponds to an oscillating frequency of the plurality of oscillation frequencies, wherein each row of the data matrix corresponds to the integer constant; calculating, for each row of the data matrix, a standard deviation, resulting in a plurality of standard deviations; identifying a smallest standard deviation from the plurality of standard deviations; and calculating, based on the integer constant of the row with the smallest standard deviation, the distance to the target.

Embodiment 10: The apparatus (103) of embodiment 7, wherein the instructions of the data store further comprise: fitting a frequency-domain sinusoidal wave to the plurality of resultant RF tones in a frequency domain; and determining the distance to the target based at least in part on a modulation of the frequency-domain sinusoidal wave.

Embodiment 11: An apparatus (103), comprising: a signal emitter; a signal receiver (218): a modulator; a beam splitter (121); and at least one computing device comprising at least one processor and a data store comprising executable instructions, wherein the instructions, when executed by the at least one processor, cause the apparatus (103) to at least: generate an initial signal, wherein the initial signal is split by the beam splitter (121) into a reference arm and a measurement arm; modulate, by the modulator, the measurement arm based on a plurality of initial radio frequency (RF) tones, wherein the measurement arm becomes a multi-tone continuous wave signal, wherein the plurality of initial RF tones have a fixed phase relationship; identify a reflected signal, the reflected signal being a version of the measurement arm reflected from a target, wherein the signal receiver (218) receives the reflected signal and the reference arm; create a superposition of the reflected signal and the reference arm and then generate a photocurrent of the superposition of signals; interpolate the superposition of signals; determine a plurality of resultant RF tones based at least in part on the reflected signal, a respective one of the plurality of resultant RF tones comprising a frequency and a phase; locate, if a cross-beating of the initial signal and the reflected signal is detected a plurality of frequency spikes corresponding to a Doppler shift near a baseband of the initial signal and at detected tone frequencies; measure a Doppler shift based on the plurality of frequency spikes or based on a shift in tone frequencies to a yield a velocity of the target; calculate a 0-phase cosine comparison of RF tones from the plurality of resultant RF tones to generate a plurality of relative phase differences; calculate, by the plurality of relative phase differences, a distance to the target; and create a beating of a selected set of measured RF tones either in analog domain or in digital domain to cancel common noise terms; wherein the apparatus (103) is capable of operating outside of a coherence length of the signal emitter with common noise cancellation.

Embodiment 12: The apparatus (103) of embodiment 11 further comprising a collimator (118) for aligning the measurement arm as it is directed towards the target.

Embodiment 13: The apparatus (103) of embodiment 11, wherein calculating the distance to the target comprises: calculating, based on each relative phase difference of the plurality of relative phase differences, a relative frequency difference corresponding to the relative phase difference, and an integer constant, a possible distance to the target, resulting in a plurality of possible distances; generating a data matrix of data from calculating the plurality of possible distances, wherein each column of the data matrix corresponds to a relative phase difference, wherein each row of the data matrix corresponds to the integer constant; calculating, for each row of the data matrix, a standard deviation, resulting in a plurality of standard deviations; identifying a smallest standard deviation from the plurality of standard deviations; and calculating, based on the integer constant of the row with the smallest standard deviation, the distance to the target.

Embodiment 14: The apparatus (103) of embodiment 11, wherein the data store further comprises instructions for: calculating a 0-phase cosine comparison of Doppler shifted RF tones from the plurality of resultant RF tones to generate a plurality of relative phase differences; and calculating a 0-phase cosine comparison of mixed Doppler shifted RF tones from the plurality of resultant RF tones to generate a plurality of relative phase differences.

Embodiment 15: The apparatus (103) of embodiment 11, wherein the modulator comprises a Mach-Zehnder modulator (109), wherein the Mach-Zehnder modulator (109) modulates the measurement arm into an amplitude modulated laser beam (907) based at least in part on inputs to the Mach-Zehnder modulator (109) comprising: a laser beam (907), and the plurality of initial RF tones.

Embodiment 16: The apparatus (103) of embodiment 11, wherein the modulator comprises an electroabsorption modulator or a direct modulator.

Embodiment 17: The apparatus (103) of embodiment 11, wherein the signal emitter comprises a laser source (106).

Embodiment 18: The apparatus (103) of embodiment 11, wherein the signal emitter comprises a RADAR source.

Embodiment 19: The apparatus (103) of embodiment 18, wherein the initial signal comprises a carrier frequency, wherein the modulator modulates the reference arm with a plurality of phase-locked modulation frequencies for the purpose of RADAR ranging and velocimetry.

Embodiment 20: The apparatus (103) of embodiment 18, wherein the initial signal comprises a carrier frequency modulated by a plurality of phase-locked modulation frequencies, wherein the measurement arm skips the modulator for the purpose of RADAR ranging and velocimetry.

Embodiment 21: The apparatus (103) of embodiment 11, wherein the signal emitter comprises a transmission antenna, wherein the signal receiver (218) comprises a receiver antenna with a separate source and having a frequency difference from the transmission antenna within a bandwidth of the receiver circuit for the purpose of GPS and navigation.

Embodiment 22: An apparatus (1000) comprising: a transmitter (1002) capable of producing a plurality of RF tones (1001), wherein the plurality of RF tones (1001) comprises a sum of multiple single side band modulation or double side band modulation; a transmit antenna or optics (1003) operatively coupled to the transmitter (1002) capable of generating a transmitted signal (1004) based on the plurality of RF tones (1001) to a target (1005); a receiver antenna or optics (1007) capable of receiving a reflected signal (1006) from the target (1005) based on the transmitted signal (1004); a local oscillator (1008) capable of generating a reference signal (1009); a beam combiner (1010) capable of receiving the reflected signal (1006) from the receiver antenna (1007) and the reference signal (1009) from the local oscillator (1008) to generate a superposition signal (1011); a photodetector (1012) capable of receiving the superposition signal (1011) to be converted into an electrical current; and an electronic processing component (1013) comprising a processor capable of executing computer-readable instructions and a memory component comprising a plurality of computer-readable instructions comprising: accepting the electrical current from the photodetector (1012); processing the electrical current: and providing a plurality of phase, frequency and amplitude data of the plurality of RF tones (1001) measured from the electrical current.

Embodiment 23: The apparatus (1000) of embodiment 22, wherein the plurality of RF tones (1001) comprise a sum of multiple RF frequency tones such that the plurality of RF tones (1001) are non-harmonic, harmonic of a common RF reference signal, subharmonic of a common RF signal, phase-locked, or a combination thereof.

Embodiment 24: The apparatus (1000) of embodiment 22, wherein the plurality of RF tones (1001) comprise a sum of multiple RF subcarrier modulation signals.

Embodiment 25: The apparatus (1000) of embodiment 22, wherein the plurality of RF tones (1001) comprise a broadband RF signal with distinguishable frequency characteristics that are suitable for phase, frequency, and amplitude measurement at a selected part of the spectrum of the apparatus (1000).

Embodiment 26: The apparatus (1000) of embodiment 22, wherein the transmitter (1002) comprises an electromagnetic signal generator selected from a group comprising a laser, an RF generator, a TeraHertz (THz) generator, or a source operating at any frequency of the electromagnetic spectrum.

Embodiment 27: The apparatus (1000) of embodiment 22, wherein the transmitter (1002) comprises a source and an external modulator capable of encoding RF tones (1001) and generating a multi-tone continuous wave (CW) signal.

Embodiment 28: The apparatus (1000) of embodiment 22, wherein the transmitter (1002) comprises a source having a direct modulation capability to encode RF tones (1001) and generating a multi-tone continuous wave (CW) signal.

Embodiment 29: The apparatus (1000) of embodiment 22, wherein the transmitter (1002) is capable of generating a multi-tone continuous wave signal or a quasi-continuous wave signal with multi-tone RF modulation for ranging, velocimetry, global positioning, and navigation.

Embodiment 30: The apparatus (1000) of embodiment 29, wherein the transmitter (1002) is capable of generating, by a linear or non-linear optical processor, a plurality of desired sidebands.

Embodiment 31: The apparatus (1000) of embodiment 22, wherein the transmitter (1002) is capable of generating a multi-tone continuous wave or a quasi-continuous wave RF or a TeraHertz signal after mixing the plurality of RF tones (1001) with a carrier frequency.

Embodiment 32: The apparatus (1000) of embodiment 22, wherein the transmitter (1002) is capable of generating a multi-tone continuous wave or a quasi-continuous wave RF or a TeraHertz signal by adding the plurality of RF tones (1001).

Embodiment 33: The apparatus (1000) of embodiment 22, wherein the transmit antenna (1003) shapes an output of the transmitter (1002) to deliver enough power to echo back from the target (1005).

Embodiment 34: The apparatus (1000) of embodiment 22, wherein the transmit antenna (1003) comprises a beam collimator, a beam focusing element, or a diverging element.

Embodiment 35: The apparatus (1000) of embodiment 22, wherein the receiver antenna (1007) and the transmit antenna (1003) comprise a single communication component.

Embodiment 36: The apparatus (1000) of embodiment 22, wherein the local oscillator (1008) comprises a fraction of the transmitter (1002) with encoded RF modulation.

Embodiment 37: The apparatus (1000) of embodiment 22, wherein the local oscillator (1008) comprises a fraction of the transmitter (1002) without encoded RF modulation.

Embodiment 38: The apparatus (1000) of embodiment 22, wherein the local oscillator (1008) comprises a frequency shifted transmitter with encoded RF modulation to compensate for at least a portion of a Doppler shift of the reflected signal.

Embodiment 39: The apparatus (1000) of embodiment 22, wherein a frequency difference between the transmitter (1002) and the local oscillator (1008) is fixed.

Embodiment 40: The apparatus (1000) of embodiment 22, wherein a frequency difference between the transmitter (1002) and the local oscillator (1008) is within a bandwidth of the photodetector (1012).

Embodiment 41: The apparatus (1000) of embodiment 22, wherein the beam combiner (1010) comprises a free space-based beam splitter cube, a fiber-based coupler, a photonic integrated circuit, a RF mixer, a Terahertz mixer, or a combination thereof.

Embodiment 42: The apparatus (1000) of embodiment 22, wherein the electronic processing unit (1013) further comprise a data acquisition system, an analog filter, a digital filter, a RF spectrum analyzer, a frequency counter, a phase detector, and an amplitude detector.

Embodiment 43: A ranging and velocimetry apparatus (1000) comprising: a transmitter (1002) capable of generating a multi-tone signal comprising a continuous wave (CW) signal or a quasi-CW signal; a local oscillator (1008) capable of using at least a portion of the multi-tone signal from the transmitter (1002) as a reference signal; and an electronic processing unit (1013) comprising a processor capable of executing computer-readable instructions and a memory component comprising a plurality of computer-readable instructions comprising: accepting the multi-tone signal and the reference signal; generating a superposition (1011) of the multi-tone signal and the reference signal; generating, by the superposition signal (1011), a plurality of amplitude variations due to differences in phase accumulations; fitting, by the plurality of amplitude variations, the superposition signal (1011) to a sine wave; determining, by the sine fitting, a range to a target (1005); identifying a Doppler shift of the superposition signal (1011); estimating, by the Doppler shift, a velocity of the target (1005); and estimating, by the Doppler shift, a direction of movement of the target (1005).

Embodiment 44: The apparatus (1000) of embodiment 43 further comprising a frequency shifter capable of generating the reference signal to compensate for at least a portion of the Doppler shift.

Embodiment 45: The apparatus (1000) of embodiment 43, wherein the reference signal comprises a fixed frequency and a fixed phase difference from the transmitter (1002) to compensate for at least a portion of the Doppler shift.

Embodiment 46: The apparatus (1000) of embodiment 43, wherein the transmitter (1002) comprises a plurality of transmitters capable of generating red, green, and blue wavelengths.

Embodiment 47: The apparatus (1000) of embodiment 46, wherein the memory component further comprises instructions for: determining, by the sine fitting and RGB coding, a color of the target (1005).

Embodiment 48: A light detection and ranging (LIDAR) and velocimetry apparatus (1000) comprising: a transmitter (1002) capable of generating a multi-tone signal comprising a continuous wave (CW) signal or a quasi-CW signal; a local oscillator (1008) capable of using at least a portion of the multi-tone signal from the transmitter (1002) as a reference signal; and an electronic processing unit (1013) comprising a processor capable of executing computer-readable instructions and a memory component comprising a plurality of computer-readable instructions comprising: accepting the multi-tone signal and the reference signal; generating a superposition (1011) of the multi-tone signal and the reference signal, wherein generating the superposition (1011) generates beating tones; determining, by a plurality of phases of the beating tones, a broad range to a target (1005); identifying a Doppler shift of the superposition signal (1011); estimating, by the Doppler shift and the plurality of beating tones, a velocity of the target (1005); and determining, based on the plurality of beating tones and the broad range to the target (1005), a precise range to the target (1005).

Embodiment 49: The apparatus of embodiment 48, wherein determining the precise range to the target (1005) comprising a triangulation algorithm utilizing phases of the plurality of beating tones.

Embodiment 50: The apparatus of embodiment 49, wherein determining the precise range further comprising using time-of-arrival information of pulses of the multi-tone signal.

Embodiment 51: The apparatus (1000) of embodiment 49 further comprising a frequency shifter capable of generating the reference signal to compensate for at least a portion of the Doppler shift.

Embodiment 52: The apparatus (1000) of embodiment 49, wherein the reference signal comprises a fixed frequency and a fixed phase difference from the transmitter (1002) to compensate for at least a portion of the Doppler shift.

Embodiment 53: The apparatus (1000) of embodiment 52, wherein the reference signal comprises an independent unmodulated CW or quasi-CW signal.

Embodiment 54: The apparatus (1000) of embodiment 52, wherein the reference signal comprises an independent unmodulated free-running CW or quasi-CW signal.

Embodiment 55: The apparatus (1000) of embodiment 49, wherein the memory component further comprises instructions for: mixing, by an analog or digital mixer, a selected set of the plurality of beating tones to cancel common noise terms and perform ranging of the target (1005) beyond a coherence length of the transmitter (1002).

Embodiment 56: A RADAR ranging and velocimetry apparatus (1000) comprising: a transmitter (1002) capable of generating a multi-tone signal comprising a continuous wave (CW) signal, a quasi-CW signal, or a TeraHertz signal; a local oscillator (1008) capable of using at least a portion of the multi-tone signal from the transmitter (1002) as a reference signal; and an electronic processing unit (1013) comprising a processor capable of executing computer-readable instructions and a memory component comprising a plurality of computer-readable instructions comprising: accepting the multi-tone signal and the reference signal; generating a superposition (1011) of the multi-tone signal and the reference signal, wherein generating the superposition (1011) generates beating tones; determining, by a plurality of phases of the beating tones, a broad range to a target (1005); identifying a Doppler shift of the superposition signal (1011); estimating, by the Doppler shift and the plurality of beating tones, a velocity of the target (1005); and determining, based on the plurality of beating tones and the broad range to the target (1005), a precise range to the target (1005).

Embodiment 57: The apparatus of embodiment 56, wherein determining the precise range to the target (1005) comprising a triangulation algorithm utilizing phases of the plurality of beating tones.

Embodiment 58: The apparatus of embodiment 56, wherein determining the precise range further comprising using time-of-arrival information of pulses of the multi-tone signal.

Embodiment 59: The apparatus (1000) of embodiment 58, wherein determining the precise range further comprises a triangulation algorithm utilizing phases of the plurality of beating tones.

Embodiment 60: The apparatus (1000) of embodiment 59, wherein the triangulation algorithm further utilizes relative changes in phases of the plurality of beating tones.

Embodiment 61: The apparatus (1000) of embodiment 56 further comprising a frequency shifter capable of generating the reference signal to compensate for at least a portion of the Doppler shift.

Embodiment 62: The apparatus (1000) of embodiment 56, wherein the reference signal comprises a fixed frequency and a fixed phase difference from the transmitter (1002) to compensate for at least a portion of the Doppler shift.

Embodiment 63: The apparatus (1000) of embodiment 56, wherein the reference signal comprises an independent unmodulated CW or quasi-CW signal.

Embodiment 64: The apparatus (1000) of embodiment 56, wherein the reference signal comprises an independent unmodulated free-running CW or quasi-CW signal.

Embodiment 65: A global position and navigation apparatus (1000) comprising: a remote transmitter (1002) capable of generating a multi-tone signal comprising a continuous wave (CW) signal, a quasi-CW signal, or a TeraHertz signal; a local receiver (1007) comprising a local oscillator (1008) capable of generating an independent unmodulated CW or quasi-CW signal as a reference signal; a photodetector (1012) capable of receiving the multi-tone signal and the reference signal and generating an electrical signal, wherein a frequency difference between the local oscillator (1008) and the remote transmitter (1002) is set to be within a bandwidth of the photodetector (1012); and an electronic processing unit (1013) comprising a processor capable of executing computer-readable instructions and a memory component comprising a plurality of computer-readable instructions comprising: accepting the electrical signal from the photodetector (1012); generating a superposition (1011) of the multi-tone signal and the reference signal, wherein generating the superposition (1011) generates beating tones; determining, by a plurality of phases of the beating tones, a broad range to a target (1005); identifying a Doppler shift of the superposition signal (1011); estimating, by the Doppler shift and the plurality of beating tones, a velocity of the target (1005); and determining, based on the plurality of beating tones and the broad range to the target (1005), a precise range to the target (1005).

Embodiment 66: The apparatus of embodiment 65, wherein determining the precise range to the target (1005) comprising a triangulation algorithm utilizing phases of the plurality of beating tones.

Embodiment 67: The apparatus of embodiment 65, wherein determining the precise range further comprising using time-of-arrival information of pulses of the multi-tone signal.

Embodiment 68: The apparatus (1000) of embodiment 67, wherein determining the precise range further comprises a triangulation algorithm utilizing phases of the plurality of beating tones.

Embodiment 69: The apparatus (1000) of embodiment 68, wherein the triangulation algorithm further utilizes relative changes in phases of the plurality of beating tones.

Embodiment 70: The apparatus (1000) of embodiment 65, wherein the memory component further comprises instructions for mixing, by an analog or digital mixer, a selected set of the plurality of beating tones to cancel common noise terms and perform ranging of the target (1005) beyond a coherence length of the transmitter (1002).

The reference numbers recited in the below claims are solely for ease of examination of this patent application, and are exemplary, and are not intended in any way to limit the scope of the claims to the particular features having the corresponding reference numbers in the drawings.

What is claimed is:

1. A range detection and velocimetry apparatus (1000) comprising:
   a. a transmitter (1002) capable of producing a multi-tone signal comprising a plurality of simultaneous radiofrequency (RF) tones (1001) and a plurality of corresponding simultaneous RF frequencies, wherein the plurality of RF tones (1001) comprises a sum of multiple single side band modulation or double side band modulation;
   b. a transmit antenna or optics (1003) operatively coupled to the transmitter (1002) capable of generating a transmitted signal (1004) modulated with the plurality of RF tones (1001) to a target (1005);
   c. a receiver antenna or optics (1007) capable of receiving a reflected signal (1006) from the target (1005) based on the transmitted signal (1004);

d. a local oscillator (1008) capable of generating a reference signal (1009);

e. a beam combiner (1010) capable of receiving the reflected signal (1006) from the receiver antenna (1007) and the reference signal (1009) from the local oscillator (1008) to generate a superposition signal (1011);

f. a photodetector (1012) capable of receiving the superposition signal (1011) to be converted into an electrical current; and g. an electronic processing unit (1013) comprising a processor capable of executing computer-readable instructions and a memory component comprising a plurality of computer-readable instructions comprising:
   i. accepting the reflected signal and the reference signal;
   ii. generating a superposition (1011) of the reflected signal and the reference signal, wherein generating the superposition (1011) generates beating tones;
   iii. determining, by a plurality of phases of the beating tones or relative amplitude variations of tones, a broad range to a target (1005);
   iv. identifying a Doppler shift of the superposition signal (1011);
   v. estimating, by the Doppler shift and the plurality of beating tones, a velocity of the target (1005); and
   vi. determining, based on the phase, frequency and amplitude of plurality of beating tones and the broad range to the target (1005), a precise range to the target (1005).

2. The apparatus (1000) of claim 1, wherein the plurality of RF tones (1001) comprise a sum of multiple RF frequency tones such that the plurality of RF tones (1001) are non-harmonic, harmonic of a first common RF signal, subharmonic of a second common RF signal, phase-locked, or a combination thereof.

3. The apparatus (1000) of claim 1, wherein the plurality of RF tones (1001) comprise a broadband RF signal such as subcarrier modulation signals with distinguishable frequency characteristics that are suitable for phase, frequency, and amplitude measurement at a selected part of the spectrum of the apparatus (1000).

4. The apparatus (1000) of claim 1, wherein the transmitter (1002) comprises a CW or quasi CW electromagnetic signal generator selected from a group comprising laser, an RF generator, a TeraHertz (THz) generator, or a source operating at any frequency of the electromagnetic spectrum with direct modulation or external modulation capability to encode the plurality of RF tones (1001).

5. The apparatus (1000) of claim 1, wherein the local oscillator (1008) comprises a fraction of the transmitter (1002) before or after RF modulation.

6. The apparatus (1000) of claim 1 further comprising a frequency shifter capable of generating the reference signal to compensate for at least a portion of the Doppler shift.

7. The apparatus (1000) of claim 1, wherein the reference signal comprises a fixed frequency and a fixed phase difference from the transmitter (1002) to compensate for at least a portion of the Doppler shift.

8. The apparatus (1000) of claim 1, wherein the reference signal comprises an independent unmodulated CW or quasi-CW signal.

9. The apparatus (1000) of claim 1, wherein the electronic processing unit (1013) further comprise a data acquisition system, an analog filter, a digital filter, a RF spectrum analyzer, a frequency counter, a phase detector, and an amplitude detector.

10. The apparatus of claim 1, wherein determining the precise range to the target (1005) comprising a triangulation algorithm utilizing phases of the plurality of beating tones and relative phase differences between plurality of beating tones.

11. The apparatus of claim 1, wherein determining the precise range further comprising using time-of-arrival information of pulses of the multi-tone signal.

12. The apparatus of claim 1, wherein determining the precise range further comprising generating, by the superposition signal (1011), a plurality of amplitude variations due to differences in phase accumulations and then fitting, by the plurality of amplitude variations, the superposition signal (1011) to a sine wave.

13. The apparatus (1000) of claim 1, wherein the memory component further comprises instructions for:
   a. mixing, by an analog or digital mixer, a selected set of the plurality of beating tones to cancel common noise terms and perform ranging of the target (1005) beyond a coherence length of the transmitter (1002).

14. A RADAR ranging and velocimetry apparatus (1000) comprising:
   a. a transmitter (1002) capable of generating a multi-tone signal comprising a plurality of simultaneous radiofrequency (RF) tones in a continuous wave (CW) signal, a quasi-CW signal, or a TeraHertz signal, and a plurality of corresponding simultaneous RF frequencies;
   b. a local oscillator (1008) capable of using at least a portion of the multi-tone signal from the transmitter (1002) as a reference signal; and
   c. an electronic processing unit (1013) comprising a processor capable of executing computer-readable instructions and a memory component comprising a plurality of computer-readable instructions comprising:
      i. accepting the multi-tone signal and the reference signal;
      ii. generating a superposition (1011) of the multi-tone signal and the reference signal, wherein generating the superposition (1011) generates beating tones;
      iii. determining, by a plurality of phases of the beating tones, a broad range to a target (1005);
      iv. identifying a Doppler shift of the superposition signal (1011);
      v. estimating, by the Doppler shift and the plurality of beating tones, a velocity of the target (1005); and
      vi. determining, based on the plurality of beating tones and the broad range to the target (1005), a precise range to the target (1005).

15. The apparatus of claim 14, wherein determining the precise range to the target (1005) comprising a triangulation algorithm utilizing phases of the plurality of beating tones and utilizing relative changes in phases of the plurality of beating tones.

16. The apparatus of claim 14, wherein determining the precise range further comprising using time-of-arrival information of pulses of the multi-tone signal.

17. The apparatus (1000) of claim 14, wherein the reference signal comprises an unmodulated CW or quasi-CW signal.

18. A global position and navigation apparatus (1000) comprising:
   a. a remote transmitter (1002) capable of generating a multi-tone signal comprising a plurality of simultaneous radiofrequency tones in a continuous wave (CW) signal, a quasi-CW signal, or a TeraHertz signal, and a plurality of corresponding simultaneous RF frequencies;

b. a local receiver (1007) comprising a local oscillator (1008) capable of generating an independent unmodulated CW or quasi-CW signal as a reference signal;

c. a photodetector (1012) capable of receiving the multi-tone signal and the reference signal and generating an electrical signal, wherein a frequency difference between the local oscillator (1008) and the remote transmitter (1002) is set to be within a bandwidth of the photodetector (1012); and d. an electronic processing unit (1013) comprising a processor capable of executing computer-readable instructions and a memory component comprising a plurality of computer-readable instructions comprising:
  i. accepting the electrical signal from the photodetector (1012);
  ii. generating a superposition (1011) of the multi-tone signal and the reference signal, wherein generating the superposition (1011) generates beating tones;
  iii. determining, by a plurality of phases of the beating tones, a broad range to a target (1005);
  iv. identifying a Doppler shift of the superposition signal (1011);
  v. estimating, by the Doppler shift and the plurality of beating tones, a velocity of the target (1005);
  vi. determining, based on the plurality of beating tones and the broad range to the target (1005), a precise range to the target (1005); and
  vii. mixing, by an analog or digital mixer, a selected set of the plurality of beating tones to cancel common noise terms and perform ranging of the target (1005) beyond a coherence length of the transmitter (1002).

19. The apparatus of claim 18, wherein determining the precise range to the target (1005) comprising a triangulation algorithm utilizing phases of the plurality of beating tones and utilizing the relative phase changes between tones.

20. The apparatus of claim 18, wherein determining the precise range further comprising using time-of-arrival information of quasi CW pulses of the multi-tone signal.

* * * * *